(12) United States Patent
Watanabe

(10) Patent No.: US 9,604,661 B2
(45) Date of Patent: Mar. 28, 2017

(54) STEERING COLUMN APPARATUS

(71) Applicant: NSK LTD., Tokyo (JP)

(72) Inventor: Masajirou Watanabe, Gunma (JP)

(73) Assignee: NSK Ltd. (JP)

( * ) Notice: Subject to any disclaimer, the term of this patent is extended or adjusted under 35 U.S.C. 154(b) by 0 days.

(21) Appl. No.: 14/797,528

(22) Filed: Jul. 13, 2015

(65) Prior Publication Data

US 2016/0214636 A1 Jul. 28, 2016

Related U.S. Application Data

(62) Division of application No. 14/130,066, filed on Dec. 30, 2013, now Pat. No. 9,108,672.

(51) Int. Cl.
*B62D 1/184* (2006.01)
*B62D 1/185* (2006.01)

(52) U.S. Cl.
CPC .............. *B62D 1/184* (2013.01); *B62D 1/185* (2013.01)

(58) Field of Classification Search
CPC .......... B62D 1/184; B62D 1/185; B62D 1/18; B62D 1/16
USPC ............................................ 74/493; 280/775
See application file for complete search history.

*Primary Examiner* — Keith Frisby
(74) *Attorney, Agent, or Firm* — Hartman Global IP Law; Gary M. Hatman; Michael D. Winter

(57) ABSTRACT

Construction is achieved in which a held bracket section 30 is integrally formed with the end section of an outer column by a hydroforming method, so as to be able to substantially ensure the strength and rigidity of the held bracket section 30. A spacer 37 that is made of a material that is softer than the metal plate of the outer column 20a is assembled in the inside of the held bracket section 30 and between a pair of left and right held plate sections 31. Holes for inserting a rod for fastening the position of the steering wheel are provided in portions of the spacer 37 and held plate sections 31 that are aligned with each other.

4 Claims, 20 Drawing Sheets

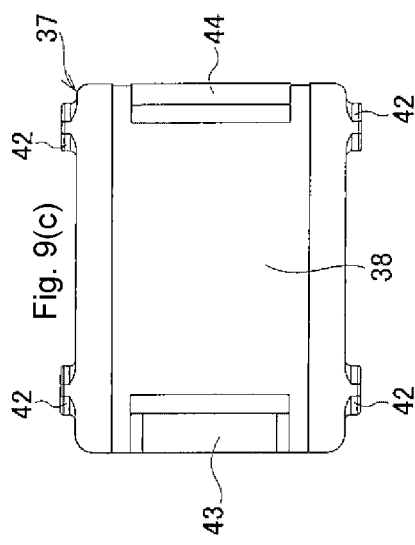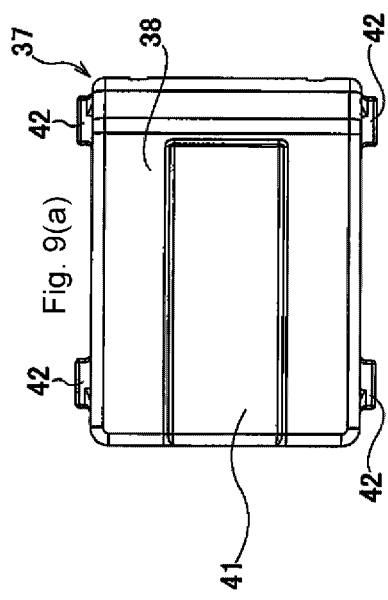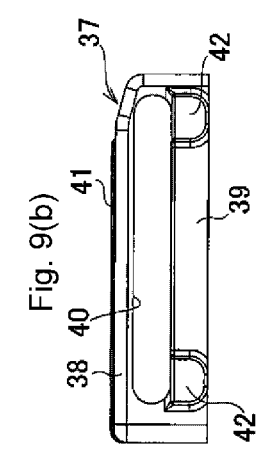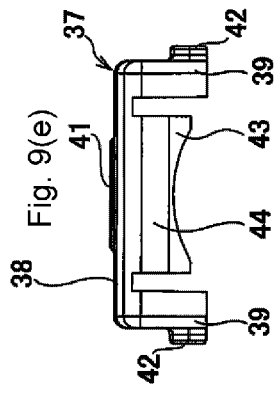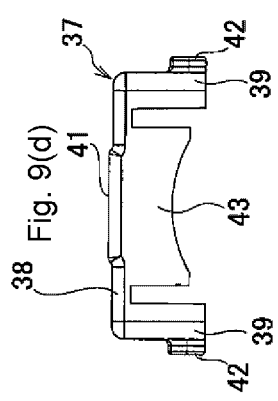

STEERING COLUMN APPARATUS

CROSS REFERENCE TO RELATED APPLICATIONS

This is a divisional patent application of co-pending U.S. patent application Ser. No. 14/130,066, filed Dec. 30, 2013.

TECHNICAL FIELD

The present invention relates to a steering column apparatus for supporting a steering shaft which rotates due to operation of a steering wheel that is provided on the driver's side on the inside thereof.

BACKGROUND ART

As illustrated in FIG. 18, a steering apparatus for an automobile is constructed so that rotation of a steering wheel 1 is transmitted to an input shaft 3 of a steering gear unit 2, and as the input shaft 3 rotates, a pair of left and right tie rods are pushed or pulled, which applies a steering angle to the front wheels of the automobile. The steering wheel 1 is supported by and fastened to the rear end section of a steering shaft 5, and this steering shaft 5 is inserted in the axial direction through a cylindrical shaped steering column 6, and is supported by the steering column so as to be able to rotate freely. The front end section of the steering shaft 5 is connected to the rear end section of an intermediate shaft 8 by way of a universal joint 7, and the front end section for this intermediate shaft 8 is connected to the input shaft 3 by way of another universal joint 9.

It has been conventionally possible to adjust the up-down position and the forward-backward position of the steering wheel 1 according to the size and driving posture of the driver. In order to enable the up-down position thereof to be adjusted, the front end section of the steering column 6 is supported by a vehicle body 11 via a horizontal shaft 10 so as to be able to pivotally displace. Moreover, a held bracket 12 that is fastened to a portion near the rear end side of the middle section of the steering column 6 is held between a pair of left and right holding plate sections 14 of a holding bracket 13 that is mounted on the vehicle body 11. A rod 15 that is inserted through this held bracket 12 is inserted through long holes 16 in the up-down direction that are formed in portions of the holding plate sections 14 that are aligned with each other. The up-down position of the steering wheel 1 can be adjusted within the range that the rod 15 is able to displace inside the long holes 16 in the up-down direction.

Moreover, in order to adjust the forward-backward position of the steering wheel 1, the steering shaft 5 and the steering column 6 are constructed so as to be able to extend and contract. The steering shaft 5 is constructed such that the rear end section of an inner shaft 17 on the front side and the front end section of an outer shaft 18 on the rear side are combined using a non-circular fit such as a spline fit so as to be able to transmit torque and to be able to displace in the axial direction. The steering column 6 is constructed such that the rear end section of an inner column 19 on the front side and the front end section of an outer column 20 on the rear side are combined and fitted together such that displacement is possible in the axial direction. Furthermore, long holes 21 in the forward-backward direction are formed in the held bracket 12 for inserting the rod 15 therein. The forward-backward position of the steering wheel 1 can be adjusted within the range that the rod 15 can displace inside the long holes 21 in the forward-backward direction.

The space between a head section 22 that is provided on the base end section of the rod 15 and a pressure piece 23 (see FIG. 5) that is fitted onto the tip end section of the rod 15 can be expanded or contracted by using an adjustment handle (not illustrated in the figure) that is attached to the rod 15 and a cam apparatus (not illustrated in the figure) that is operated by the adjustment handle. When the space between the head section 22 and the pressure piece 23 is expanded, it is possible to adjust the up-down position and the forward-backward position of the steering wheel 1. On the other hand, when the space between the head section 22 and the pressure piece 23 is contracted, the up-down position and the forward-backward position of the steering wheel 1 are held in the adjusted positions.

In order to keep down the cost for manufacturing an outer column provided with a held bracket of this kind of steering apparatus for vehicle, construction in which the held bracket and the outer column are formed integrally is effective. For example, JP 2002-249052 (A) discloses construction in which, as illustrated in FIG. 19 and FIG. 20, a pivot support bracket section 26, through which a horizontal shaft 10a for supporting the front end section of the steering column 6a by the vehicle body 11a so as to be able pivotally displace is inserted, is integrally formed with the steering column 6a. The pivot support bracket 26 is formed by hydroforming in which the metal tube of the steering column 6a is placed inside a mold, and part of this metal tube is caused to swell to match the inside shape of the mold by feeding a high-pressure fluid into the mold.

When applying this kind of hydroforming method to the integrated formation of the held bracket section to the middle section of the outer column in order to integrally form the held bracket and the outer column, preferably improvements in regards to the points (1) to (3) below.

(1) The thickness of the held bracket section that is formed by the hydroforming method is thin, and the strength and rigidity become low by that amount. Therefore, when the held bracket is firmly held between the pair of left and right holding plate sections of the holding bracket in order to maintain the adjusted position of the steering wheel, it becomes easy for the held bracket section to deform in a direction in which the width dimension thereof is reduced. When the held bracket has deformed, the support strength for supporting the outer column by the holding bracket decreases, and it becomes difficult to maintain the steering wheel in the adjusted position.

(2) The strength and rigidity of the held bracket section becomes low, so when an impact load is applied to the held bracket section during a collision accident, there is a possibility that the held bracket section will deform and the outer column will become unstable.

(3) The metal inside edges of the through holes that are formed in the held bracket section and the metal outer circumferential surface of the rod come in contact with each other. Therefore, when adjusting the forward-backward position of the steering wheel, the metal inside edges of the through holes and the metal outer circumferential surface rub or hit against each other, which causes vibration or abnormal sound that is unpleasant for the passengers and driver.

RELATED LITERATURE

Patent Literature

[Patent Literature 1] JP 2002-249052 (A)

SUMMARY OF THE INVENTION

Problem to be Solved by Invention

The object of the present invention is to provide a steering column apparatus in which the held bracket section is integrally formed on the end section of the outer column using a hydroforming method, making it possible to substantially ensure the strength and rigidity of the held bracket section, and when necessary, improve the engagement state between the held bracket section and the rod.

Means for Solving Problems

The steering column apparatus of the present invention comprises a cylindrical inner column, a cylindrical outer column, a held bracket section and a spacer. The steering column is formed by fitting together an end section of the outer column and an end section of the inner column. To facilitate the description of the embodiments of the present invention provided below, the terms "upward," "downward," "up," "down," "forward," "backward," "above," "below," "right," "left," etc., will be used in reference to the perspective of the orientation of the steering column as installed in a vehicle body, and therefore are relative terms that indicate the construction, installation and use of the invention and therefore help to define the scope of the invention.

The held bracket section is integrally formed with the outer column in the end section of the outer column that fits with the end section of the inner column by causing a metal plate of the outer column to swell outward in the radial direction. Furthermore, the held bracket section has a pair of left and right held plate sections that are parallel with each other, and a pair of through holes that are formed in portions of the held plate sections that are aligned with each other and that are for inserting a rod for expanding or contracting the space between the held plate sections.

The spacer is assembled between the held plate sections on the inside of the held bracket. The spacer is formed of a material such as a high polymer material like synthetic resin, rigid vinyl or the like that is softer than a metal material such as ferrous alloy, aluminum alloy or the like of the outer column. Insertion holes for inserting the rod are provided in portions of the spacer that are aligned with the through holes in the held bracket section. Preferably, the end section of the outer column is fitted with the end section of the inner column to form a telescopic steering column that is capable of relative displacement in the axial direction.

In one embodiment of the present invention, the held bracket is provided so as to protrude upward from the end section of the outer column. Each of the through holes is composed of a long hole section in the forward-backward direction that extends in the axial direction of the outer column, and a pair of notch sections that protrude downward from both end sections in the forward-backward direction of the long hole section in the forward-backward direction. Furthermore, the insertion holes are composed of long holes that are provided in portions that are aligned with the long hole sections in the forward-backward direction of the through holes, and that extend in the forward-backward direction and have a width dimension in the up-down direction thereof that is less than the width dimension in the up-down direction of the long hole sections in the forward-backward direction. Moreover, locking convex sections that fit with the notch sections are provided in portions of the left and right outside surfaces of the spacer on the bottom sides of both end sections in the forward-backward direction of the long holes. The top surface of the spacer comes in contact with the inside surface of the held bracket section. Furthermore, with the locking convex sections engaged with the notch sections, the top edges and bottom edges of the insertion holes are located further on the inside in the width direction of the insertion holes and the long hole sections in the forward-backward direction than the top edges and bottom edges of the long hole sections in the forward-backward direction. As a result, the outer circumferential surface of the rod that is inserted through the insertion holes and the long hole sections in the forward-backward direction does not come in contact with the inner peripheral edges of the long hole sections in the forward-backward direction.

In another embodiment of the present invention, the held bracket is provided so as to protrude downward from the end section of the outer column. Each of the through holes is composed of a long hole section in the forward-backward direction that extends in the axial direction of the outer column, and a pair of notch sections that protrude upward from both end sections in the forward-backward direction of the long hole section in the forward-backward direction. Furthermore, the insertion holes are respectively composed of a long hole that is provided in a portion that is aligned with the long hole sections in the forward-backward direction of the through holes, and that extends in the forward-backward direction and has a width dimension in the up-down direction thereof that is less than the width dimension in the up-down direction of the long hole sections in the forward-backward direction. Moreover, locking convex sections that fit with the notch sections are provided in portions of the left and right outside surfaces of the spacer on the upper sides of both end sections in the forward-backward direction of the long holes. The bottom surface of the spacer comes in contact with the inside surface of the held bracket section. Furthermore, with the locking convex sections engaged with the notch sections, the top edges and bottom edges of the insertion holes are located further on the inside in the width direction of the insertion holes and the long hole sections in the forward-backward direction than the top edges and bottom edges of the long hole sections in the forward-backward direction. As a result, the outer circumferential surface of the rod that is inserted through the insertion holes and the long hole sections in the forward-backward direction does not come in contact with the inner peripheral edges of the long hole section in the forward-backward direction.

Preferably the held bracket section is provided so as to protrude upward from the end sections of the outer column in order to simplify the design of the steering column apparatus so that the rod or the like is not arranged underneath the end section of the outer column and it is possible to prevent interference thereof with the knees of the driver.

In an embodiment in which there is not telescopic function and the outer column is fitted with the inner column such that relative displacement in the axial direction is not allowed, the held bracket section is provided so as to protrude upward from the end section of the outer column, and has locking holes provided in portions thereof near the front ends and rear ends of the held plate sections. The through holes are composed of circular holes that are formed in portions in the middle sections in the forward-backward direction of the held plate sections that are aligned with each other. The insertion holes are provided in portions at least parts of which are aligned with the through holes. Locking convex sections are provided in portions of the left and right outside surfaces of the spacer that are aligned with the locking holes. Moreover, the top surface of the spacer comes in contact with the inside surface of the held bracket section, and the locking convex sections engage with the locking holes.

Alternatively, the held bracket section is provided so as to protrude downward from the end section of the outer column, and has locking holes provided in portions thereof near the front ends and rear ends of the held plate sections. The through holes are composed of circular holes that are formed in portions in the middle sections in the forward-backward direction of the held plate sections that are aligned with each other. The insertion holes are provided in portions at least parts of which are aligned with the through holes. Locking convex sections are provided in portions of the left and right outside surfaces of the spacer that are aligned with the locking holes. Moreover, the bottom surface of the spacer comes in contact with the inside surface of the held bracket section, and the locking convex sections engage with the locking holes.

In other words, the steering column apparatus of the present invention comprises: a cylindrical inner column; a cylindrical outer column made of a metal plate and that forms a steering column by part thereof fitting with the inner column; a held bracket section that is integrally formed with the outer column by causing part of the outer column to swell outward in the radial direction and has a thickness that is less than the main portion of the outer column; and a spacer that is made of a material that is softer than the metal plate and that is assembled inside the held bracket section. The held bracket section has a pair of left and right held plate sections that are parallel with each other, and a pair of through holes that are formed in portions of the held plate sections that are aligned with each other and that are for inserting a metal rod for expanding or contracting the space between the held plate sections. Insertion holes, the inner peripheral edges thereof being smaller than the inner peripheral edges of the through holes, are provided in portions of the spacer that are aligned with the through holes. The spacer supports the held bracket section such that pressure is applied from the inside of the held bracket section, and the inner peripheral edges of the insertion holes prevent the outer circumferential surface of the rod from coming in contact with the inner peripheral edges of the through holes.

Preferably, the outer circumferential surface of the rod comes in contact with the spacer along the width direction of the spacer, and is prevented from coming in contact with the held bracket section. Moreover, preferably the spacer is provided with means for making it possible to elastically reduce the dimension in the width direction of the spacer, such that the space between the held plate sections can be easily reduced.

Effect of Invention

In the case of the steering column apparatus of the present invention, a spacer that is assembled inside a held bracket section and between a pair of left and right held plate sections of the held bracket section, supports the held bracket section from the inside. Therefore, it is possible to substantially ensure the strength and rigidity of the held bracket section. In other words, the existence of the spacer makes it difficult for the held bracket section to deform even when a pair of left and right holding plate sections of a holding bracket firmly holds the held bracket section, the thickness of which is thin. As a result, it is possible to make it difficult for the held bracket section to deform event when firmly held between the pair of left and right holding plate sections of the holding bracket in order to maintain the adjusted position of a steering wheel, and thus it becomes possible to sufficiently ensure the support strength by which the holding bracket supports the outer column. It is possible to make it difficult for the held bracket section to deform even when an impact load is applied to the held bracket section due to a collision accident, and it becomes easier to stabilize the behavior of the outer column, which is advantageous from the aspect of protecting the driver.

Moreover, in the preferred embodiment of the present invention, the inner peripheral edges of the through holes that are formed in the held bracket section and the outer circumferential surface of the rod, which are both made of a hard metal such as a ferrous alloy, do not come in contact with each other. Therefore, it is possible to prevent an occurrence of vibrations or abnormal noise that is unpleasant for the passengers and driver.

BRIEF DESCRIPTION OF DRAWINGS

FIG. 9A is a top view of the spacer of the first example as seen from above, FIG. 9B is a side view of the spacer of the first example as seen from the side, FIG. 9C is a bottom view of the spacer of the first example as seen from below, FIG. 9D is an orthographic view of the spacer of the first example as seen from the front, and FIG. 9E is an orthographic view of the spacer of the first example as seen from the rear.

MODES FOR CARRYING OUT INVENTION

First Example

Figure 1:
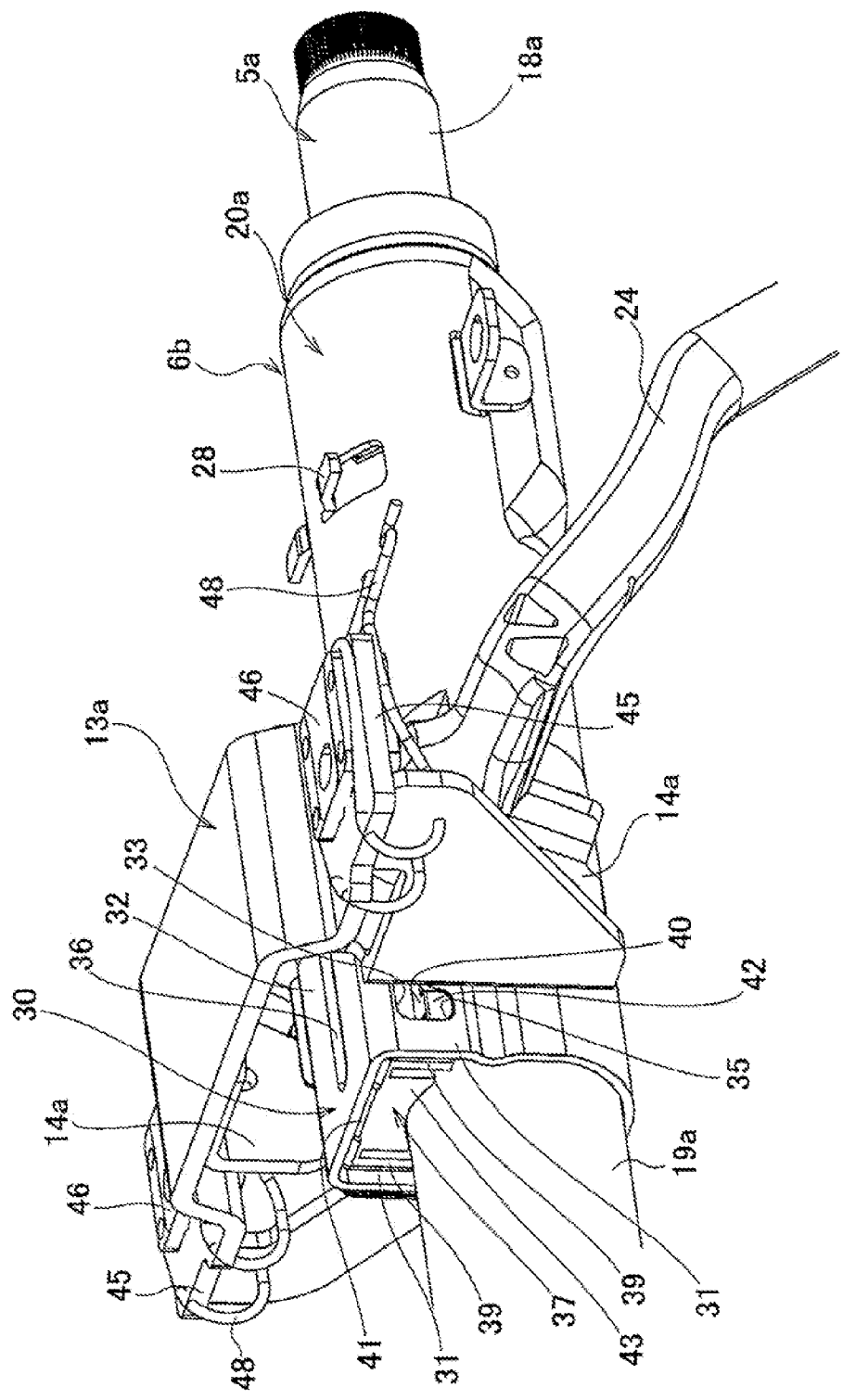
FIG. 1 is a perspective view illustrating a first example of an embodiment of the present invention.
Figure 2:
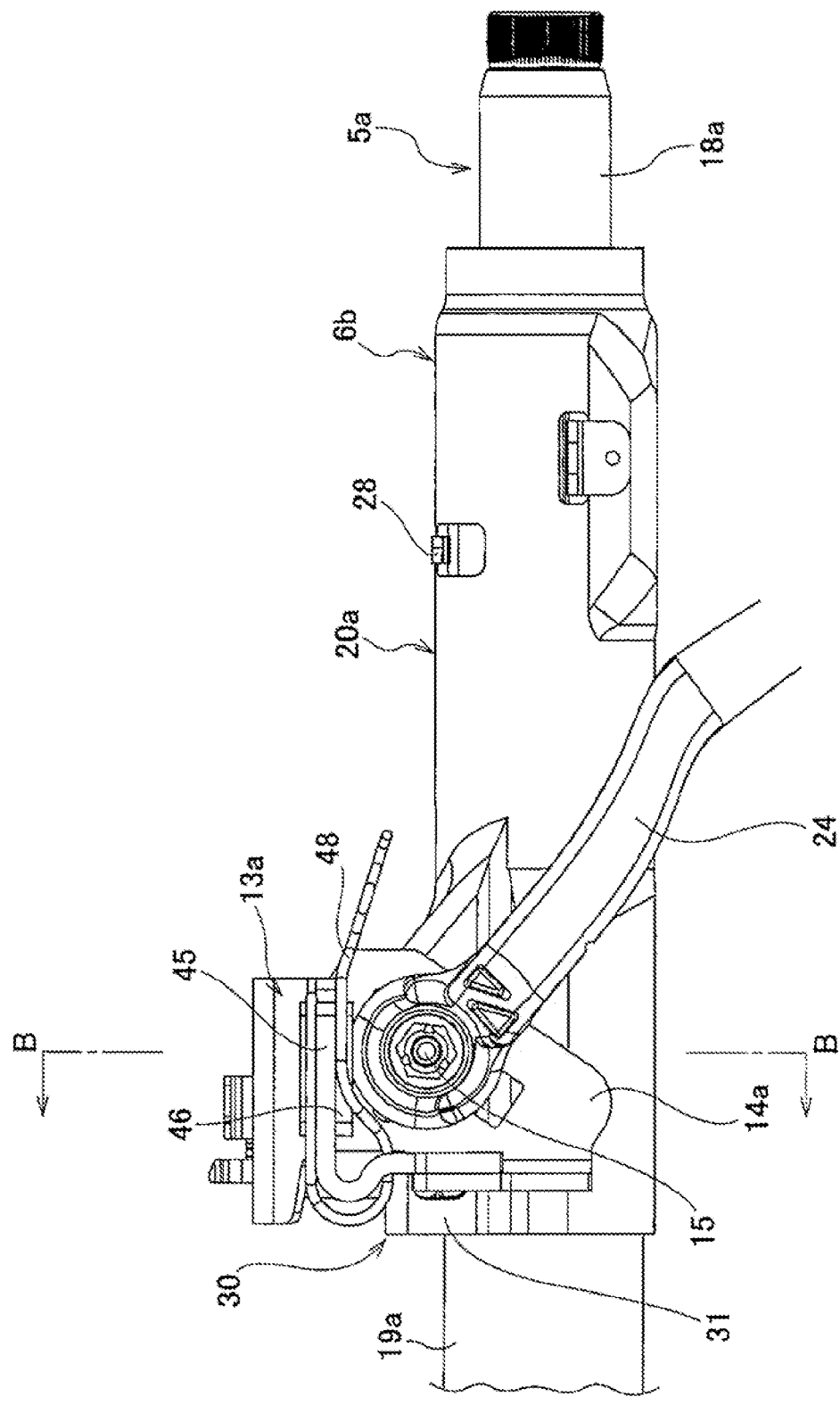
FIG. 2 is a side view of the first example as seen from the side in FIG. 1.
Figure 3:
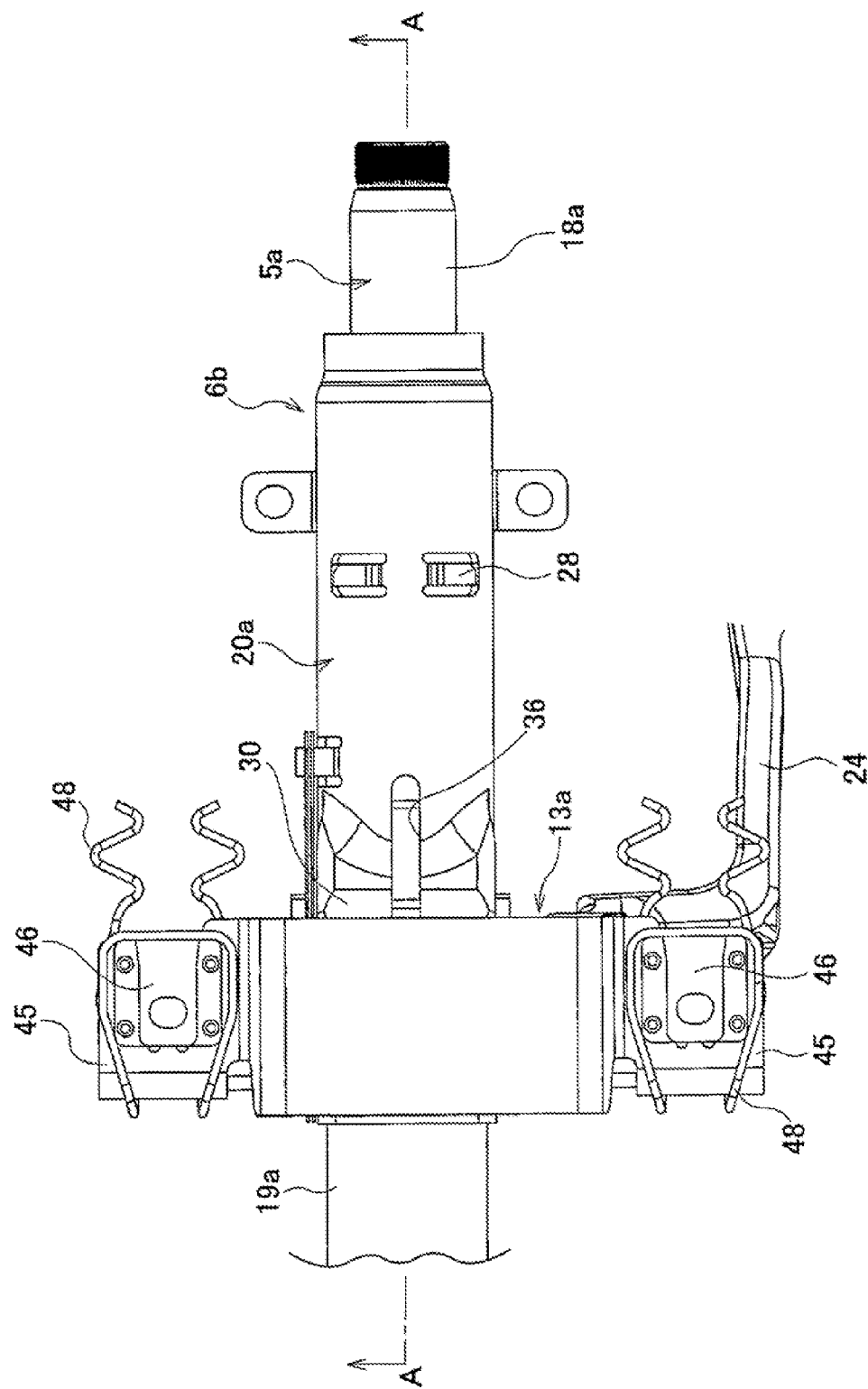
FIG. 3 is a top view of the first example as seen from above in FIG. 1.
Figure 4:
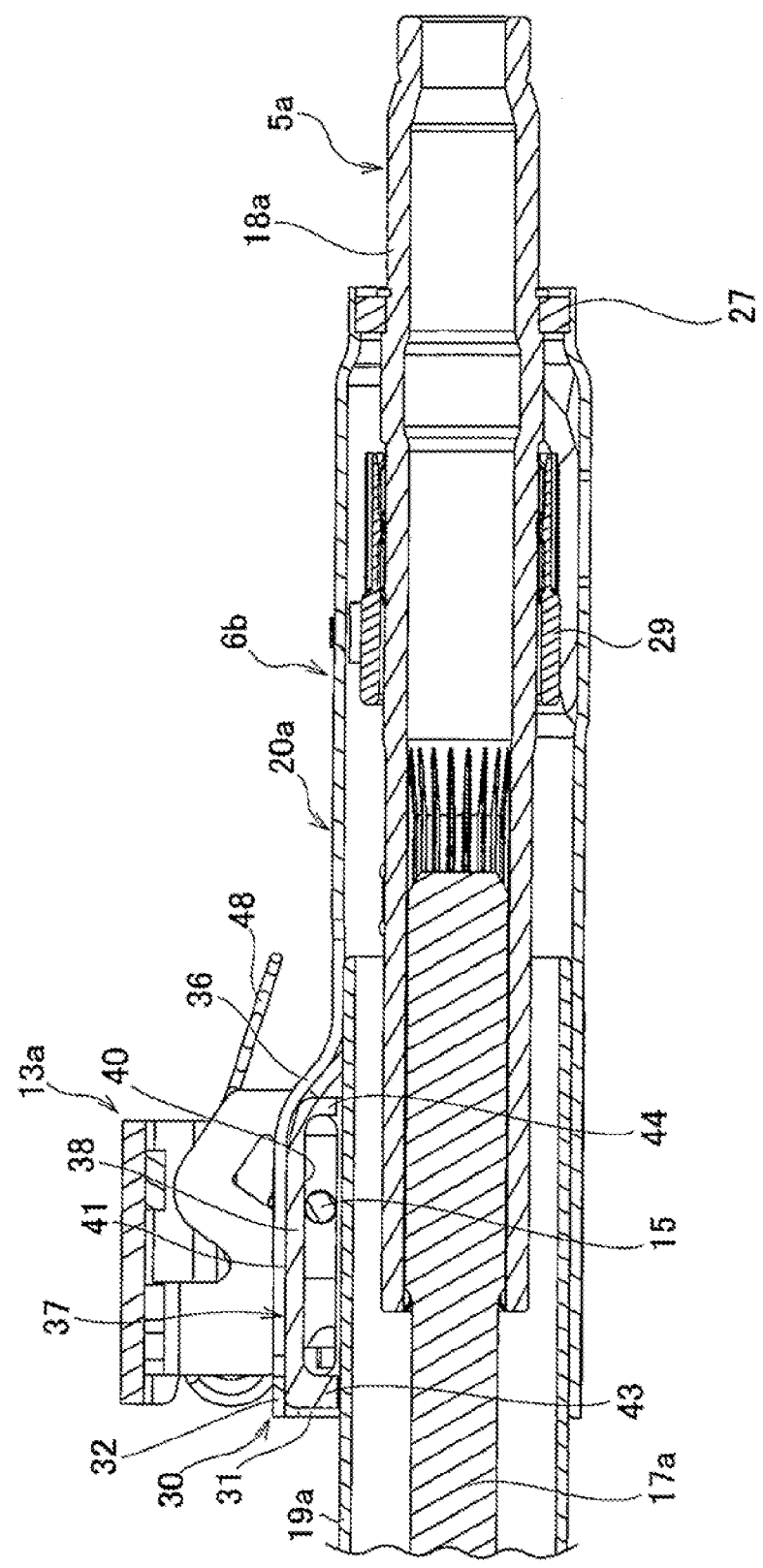
FIG. 4 is a cross-sectional view of section A-A in FIG. 3.
Figure 5:
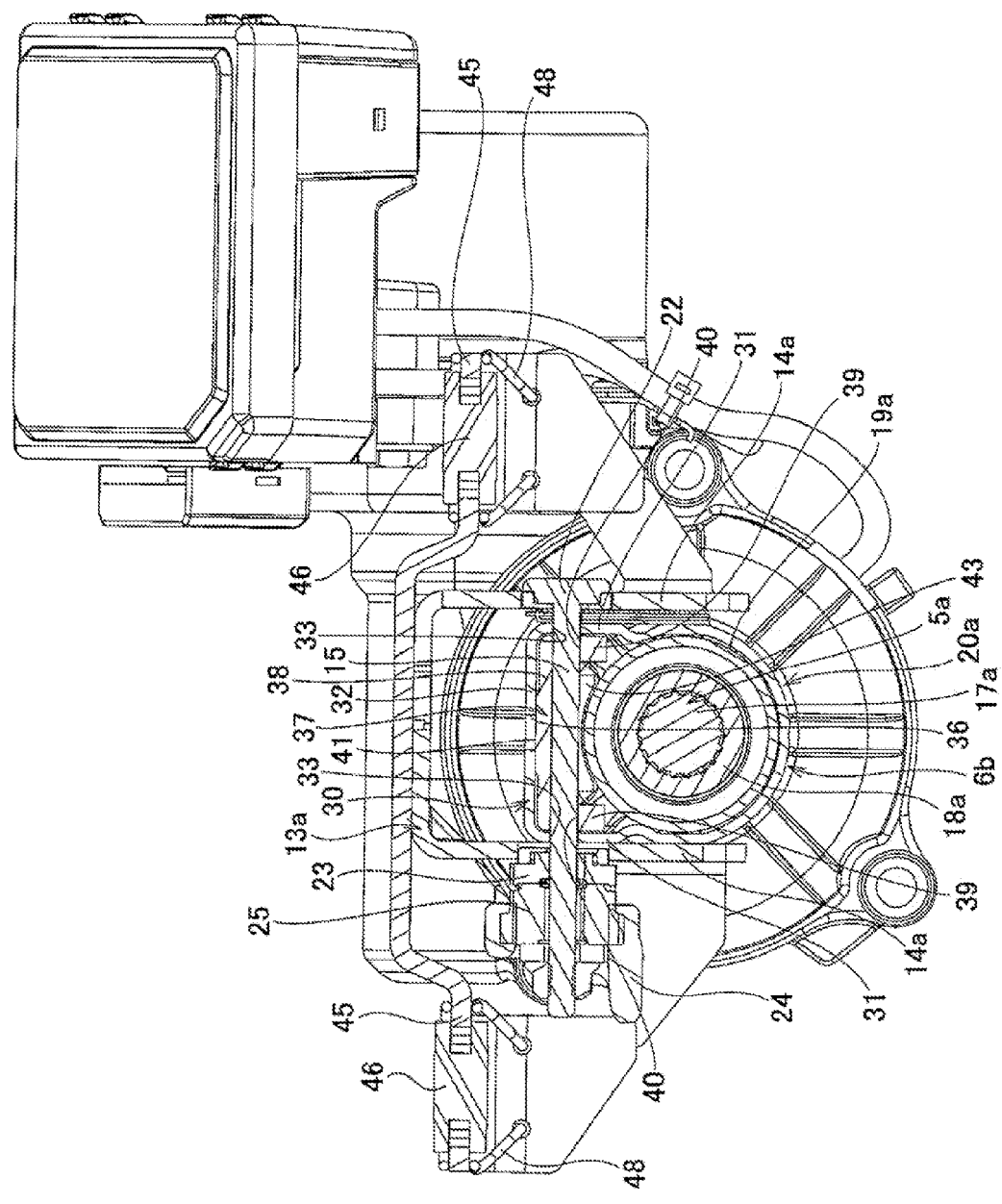
FIG. 5 is a cross-sectional view of section B-B in FIG. 2.
Figure 6:
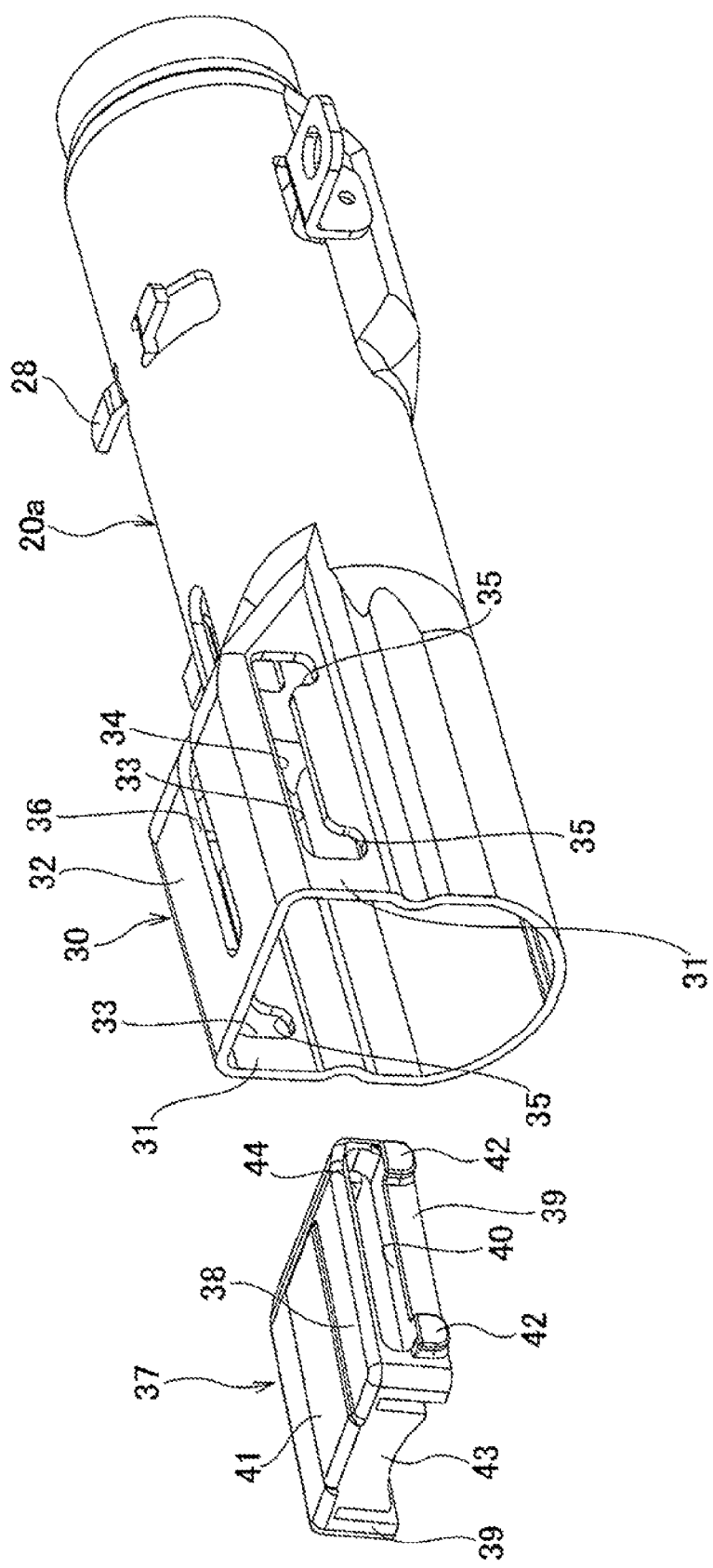
FIG. 6 is a perspective view of the outer column and spacer of the first example in the state before combining these members as seen from the same direction as FIG. 1.
Figure 7:
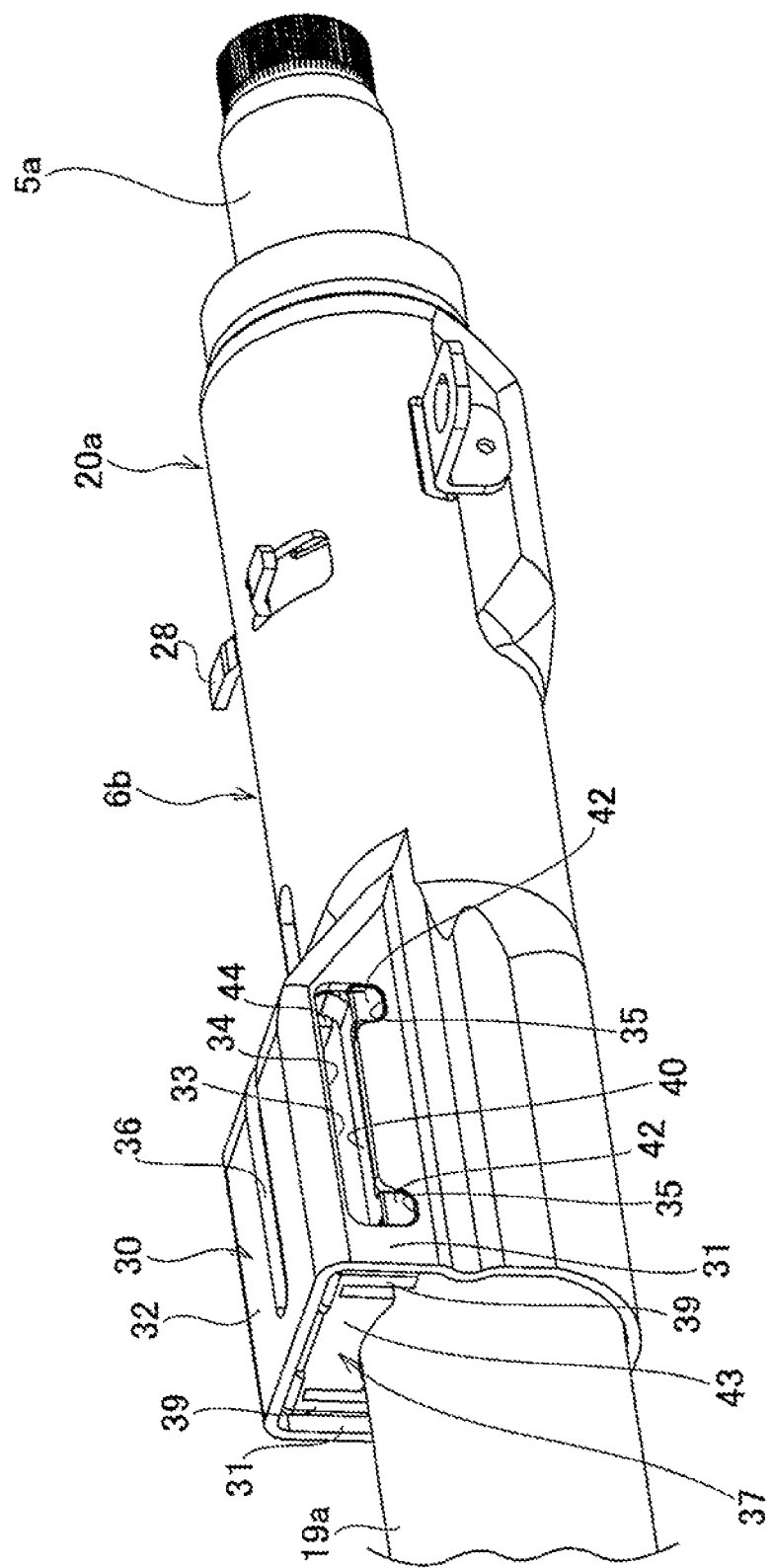
FIG. 7 is a perspective view of the outer column, spacer and inner column of the first example in the state after combining these members as seen from the same direction as FIG. 1.
Figure 8:
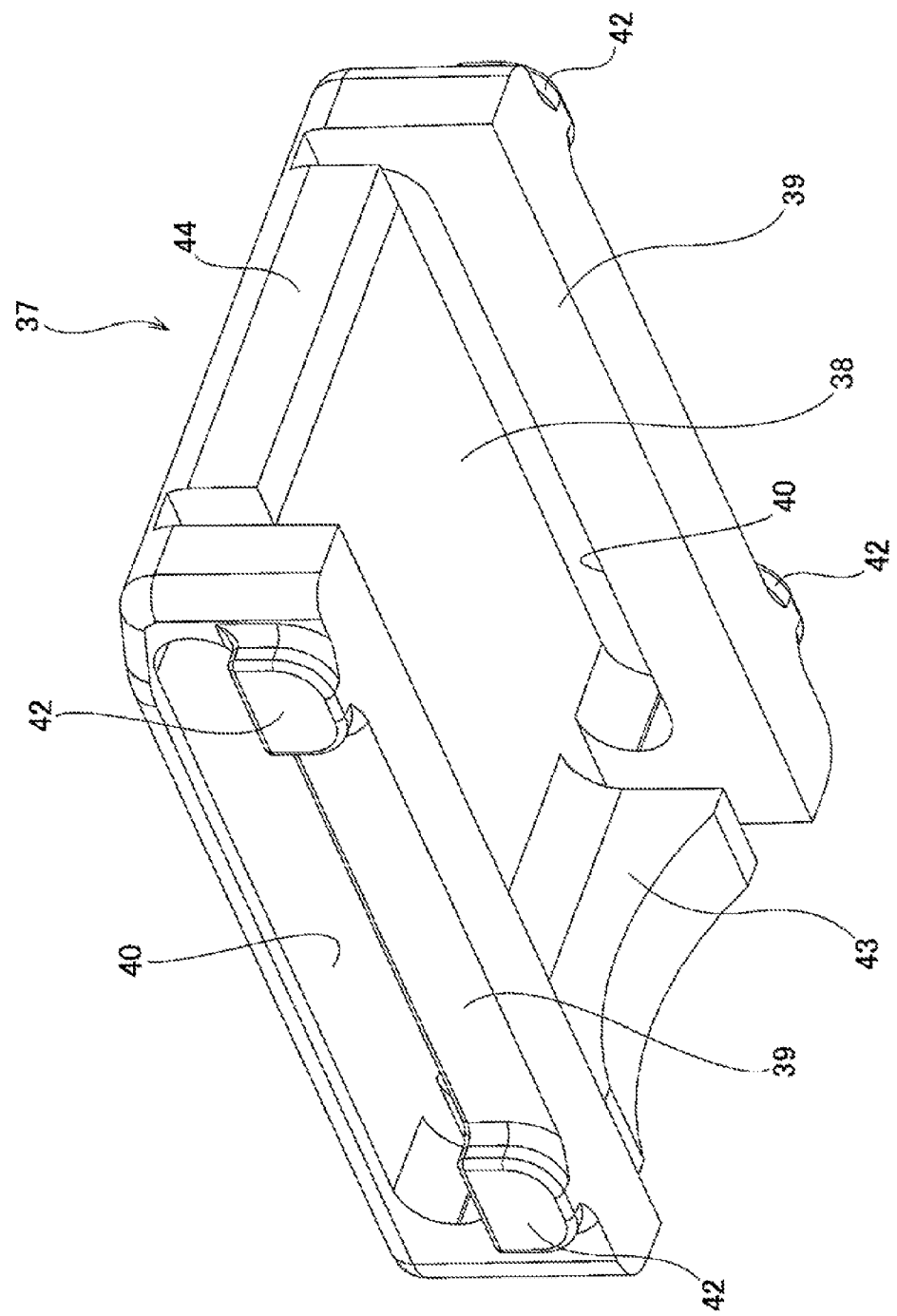
FIG. 8 is a perspective drawing of a removed spacer of the first example as seen from below and rear.
Figure 10:
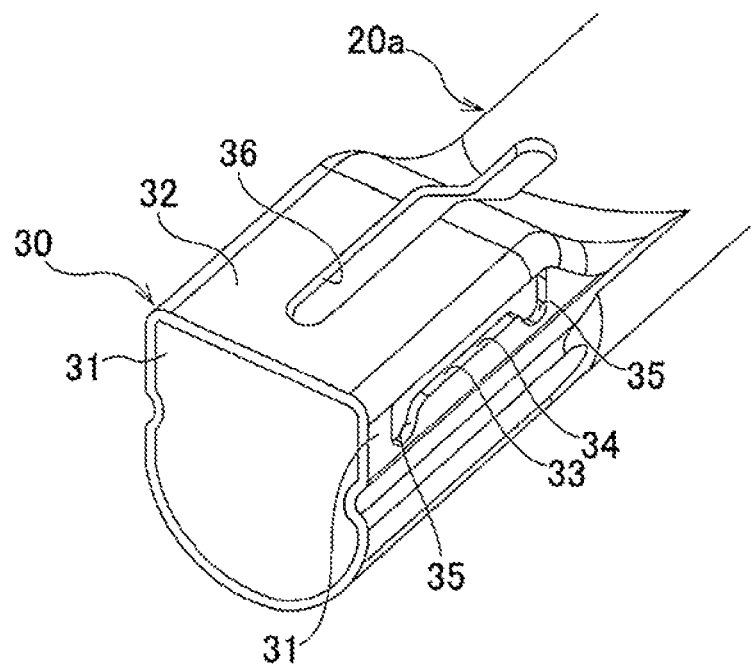
FIGS. 10A and 10B are perspective views of two examples of the shape of a slit formed in the top surface of the outer column as applied in the first example, and illustrates the state as seen further from above than in FIG. 6.
Figure 10:
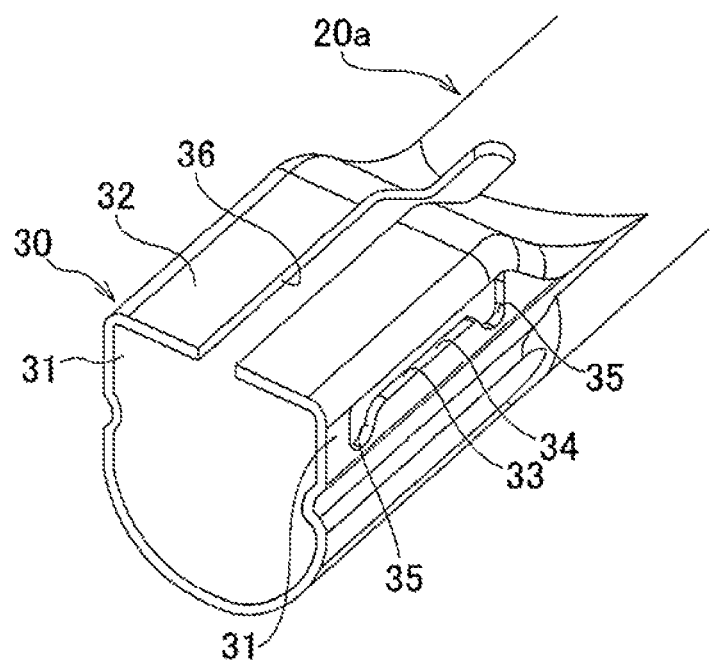

FIG. 1 to FIG. 10B illustrates a first example of an embodiment of the present invention. The steering column 6b of this example is a telescopic steering column that is constructed by fitting the front end section of a cylindrical outer column 20a with the rear end section of a cylindrical inner column 19a such the relative displacement in the axial direction is possible. A steering shaft 5a is supported on the inside of the steering column 6b by a bearing 27, such as a single-row deep-groove ball bearing, so as to be able to rotate freely. The steering shaft 5a is constructed by fitting together the rear end section of a circular rod shaped inner shaft 17a and the front end section of cylindrical shaped outer shaft 18a with a spline fit such that torque can be transmitted, and such that entire length can be expanded or contracted. A locking section 28 is provided for locking a balancing spring in the outer surface of the outer column 20a. A key-lock collar 29 of a steering lock apparatus is fitted around the middle section of the outer shaft 18a. The construction described above and the effects thereof are the same as in a conventional steering column apparatus.

Particularly, in the steering column 6b of this example, the held bracket section 30 is integrally formed with the outer column 20a in the portion on the front end section of the outer column 20a that fits with the rear end section of the inner column 19 by a hydroforming method, for example, that causes the metal plate of the outer column to swell outward in the radial direction. In this example, the held bracket section 30 is provided so as to protrude upward from the front end section of the outer column 20a, and has a pair of left and right held plate sections 31 and a top plate section 32. The pair of held plate sections 31 are parallel with each other and are formed so as to be continuous upward from the main section of the outer column 20a. The top plate section 32 is formed so as to be continuous with the edges on the top ends of the pair of left and right held plate sections 31. Therefore, the held bracket section 30 is a box shape that is open toward the bottom and front. The method for processing the held bracket section 30 is not limited to a hydroforming method, and it is possible to use another processing method such as pressing, bulging, vacuum forming, air blow molding, explosive forming, and the like.

In this example, a pair of through holes 33 is formed in portions of the held plate sections 31 that are aligned with each other. The through holes 33 are for inserting the rod 15 of the expansion and contraction mechanism that expands or contracts the space between the held plate sections 31, and each is composed of long hole section 34 that is long in the forward-backward direction and a pair of notch sections 35. The long hole sections 34 in the forward-backward direction extend in the axial direction of the outer column 20a. Moreover, the notch sections 35 are provided so as to protrude downward from both end sections in the forward-backward direction of the long hole sections 34 in the forward-backward direction. Furthermore, a slit 36 is formed in the center section in the width direction of the top surface of the front end section of the outer column 20a, and reduces the force that is required for reducing the inner diameter of the front end section of this outer column 20a. The shape of the slit 36, for example, can be a shape that is not open on the front end edge of the outer column 20a as illustrated in FIG. 1, FIG. 4, FIG. 6, FIG. 7 and FIG. 10A. Alternatively, the shape can be such that the slit is open in the front end edge of outer column 20a as illustrated in FIG. 10B. When it is not necessary to reduce the force, it is possible to omit this slit.

In this example, a spacer 37 is installed in the inside portion of the held bracket section 30 on the front end section of the outer column 20a. This spacer 37 is made by injection molding using a synthetic resin, and has a rectangular shaped base plate section 38, and a pair of downward hanging plate sections 39 that are parallel with each other and that hang downward from both the left and right end sections of the bottom surface of the base plate section 38. Long holes 40 that extend in the forward-backward direction are formed in portions of the pair of downward hanging plate sections 39 that aligned with each other. The long holes 40 are formed in locations such that when the spacer is assembled inside the held bracket section 30, they are aligned with the long hole sections 34 in the forward-backward direction of the through holes 33 that are formed in the held plate sections 31. Moreover, the top edges (upper side of the inner perimeter surfaces) of the long hole sections 34 in the forward-backward direction are positioned on the same plane as the bottom surface of the base plate section 38.

The width dimension in the up-down direction and the length dimension in the forward-backward direction of the long holes 40 are a little less than the width dimension in the up-down direction and the length dimension in the forward-backward direction of the long hole sections 34 in the forward-backward direction. When the spacer 37 is assembled inside the held bracket section 30, the inner peripheral edges of the long holes 40 protrude a little further toward the side of the center section in the width direction and the center section in the length direction than the inner peripheral edges of the long hole sections 34 in the forward-backward direction. The rod 15 for expanding and contracting the space between the pair of left and right holding plate sections 14a of the holding bracket 13a that is supported on the vehicle side is inserted through the long holes 40 and the long hole sections 34 in the forward-backward direction. The dimensions and positional relationship of the long holes 40 and the long hole sections 34 in the forward-backward direction are regulated as described above, so the outer circumferential surface of the rod 15 does not come in contact with the inner peripheral edges (upper edge, bottom edge, front edge and rear edge) of the long hole sections 34 in the forward-backward direction even though it comes in contact with the inner peripheral edges of the long holes 40 and the bottom surface of the base plate section 38.

Moreover, in order to assemble the spacer 37 in a specified position such as described above, a convex section 41 is formed on the top surface of the base plate section 38, and locking convex sections 42 are formed in the portions on the bottom side of both end sections in the forward-backward direction of the long holes 40 in part of both the left and right outside surfaces of the downward hanging plate sections 39. The convex section 41 is provided so as to protrude upward a little from the center section in the width direction of the base plate section 38. The locking convex sections 42 are formed on both end sections in the forward-backward direction of the through holes 33, and have a shape and size so as to be able to fit with the notch sections 35 such that there is hardly any gaps except for small gaps that may occur due to manufacturing tolerances.

Moreover, a front restraining plate section 43 and a rear restraining plate section 44 that protrude downward are formed on both the front and rear end sections of the base plate section 38. The bottom end surface of the front restraining plate section 43 is a partially arc shaped concave curved surface, and the bottom end surface of the rear restraining plate section 44 is a flat surface. The bottom end surfaces of both the front restraining plate section 43 and the rear restraint plate section 44, in the assembled state of the steering column apparatus, come in contact with or closely face the outer circumferential surface (top surface) of the rear end section of the inner column 19a as illustrated in FIG. 1, FIG. 4, FIG. 5 and FIG. 7. This improves the bending rigidity of the fitting section between the rear end section of the inner column 19a and the front end section of the outer column 20a.

The spacer 37 is pressed inside the held bracket section 30 in the state where the space between the held plate sections 31 is elastically expanded and the center section in the width direction of the top plate section 32 is elastically deformed upward, and in the state where the spacer 37 is elastically deformed such that it is contracted in the width direction. As a result, the locking convex sections 42 engage with the notch sections 35. In this state, the bottom surfaces of the locking convex sections 42 are elastically pressed against the bottom end edges of the notch sections 35, and the top surface of the convex section 41 is pressed against the bottom surface of the top plate section 32. Moreover, the outside surfaces of the downward hanging plate sections 39 elastically come in contact with the inside surfaces of the held plate sections 31. In short, the convex section 41 and the locking convex sections 42 press the bottom surface of the top plate section 32 upward and the locking notch sections 35 downward. At the same time, the downward hanging plate sections 39 press the held plate sections 31 in the left-right direction. As a result, the spacer 37 is held inside the held bracket section 30 such that there is no loose movement in the up-down or left-right directions.

In this way, the spacer 37 is held and fastened inside the held bracket section 30, and by combining the outer column 20a with the inner column 19a, a telescopic steering column 6b is formed. Furthermore, the held bracket section 30 of the steering column 6b is supported between the pair of left and right holding plate sections 14a of the holding bracket 13a such that the up-down position and the forward-backward position can be adjusted.

Figure 18:
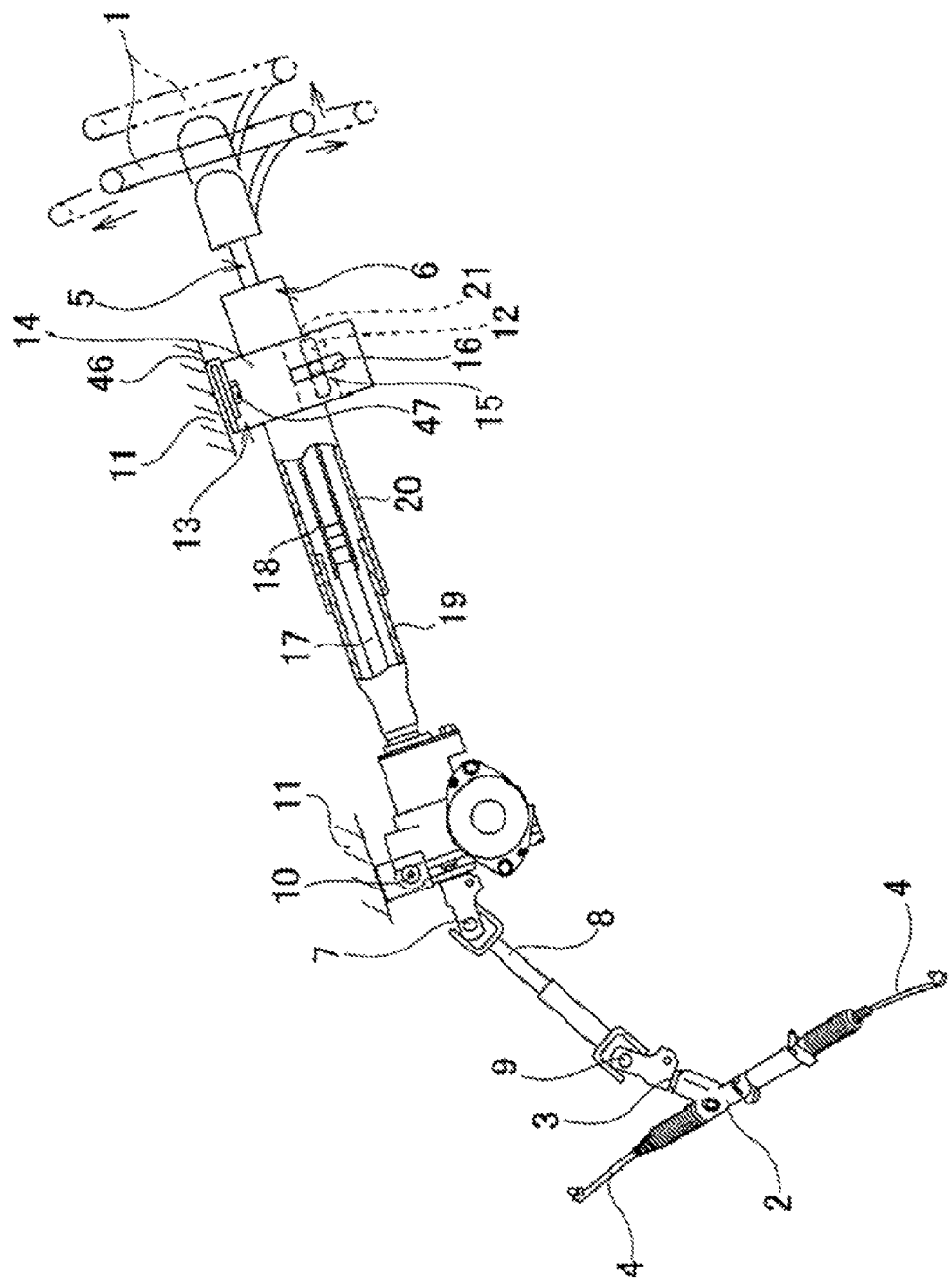
FIG. 18 is partial cross-sectional view that illustrates an example of a conventionally known steering apparatus.
Figure 19:
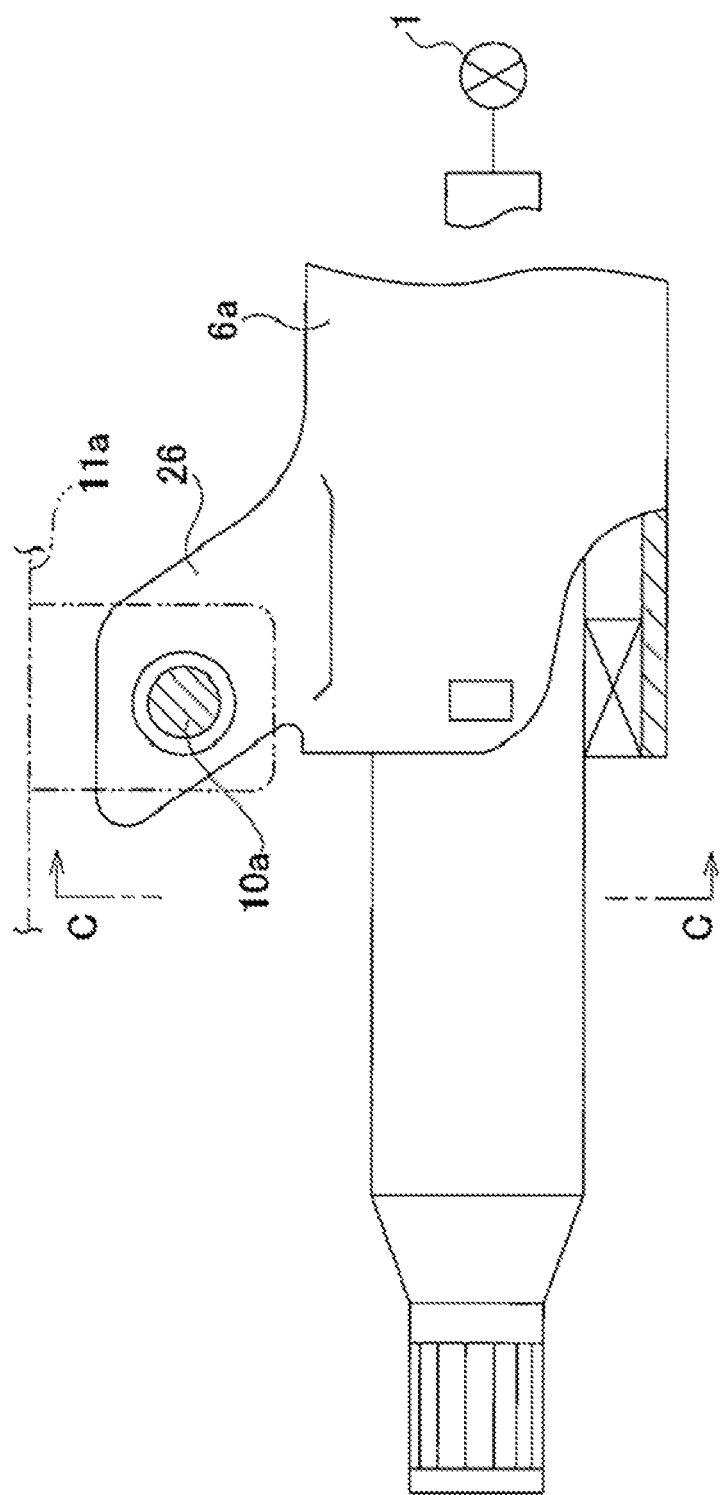
FIG. 19 is partial cross-sectional view that illustrates an example of a steering column that is integrated with a pivot support bracket.
Figure 20:
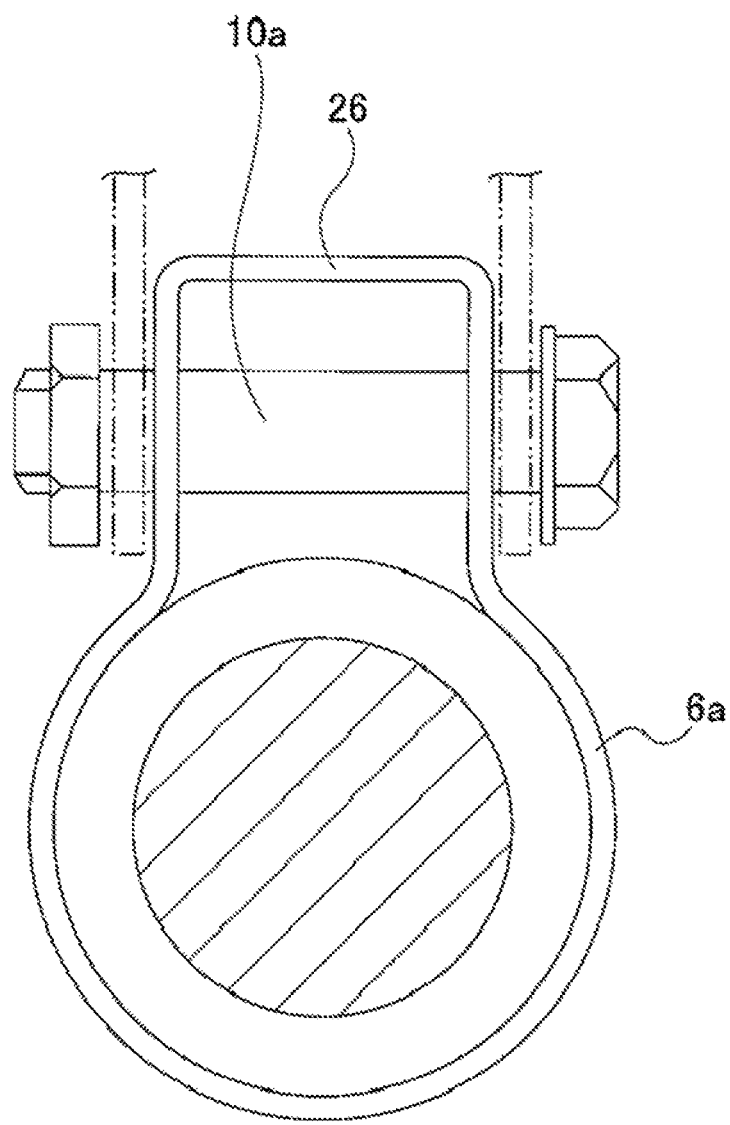
FIG. 20 is a cross-sectional view of section C-C in FIG. 19.

Furthermore, a pair of left and right installation plate sections 45 that are provided on the holding bracket 13a are supported by the vehicle body 11 (see FIG. 18) via a pair of locking capsules 46 and bolts or studs 47 (see FIG. 18) so as to be able to break away in the forward direction during a secondary collision. Moreover, an energy absorbing member 48 for absorbing impact energy that is applied to the holding bracket 13a during a secondary collision is provided between the locking capsule 46 and the installation plate section 45. This kind of construction for allowing displacement of the holding bracket 13a in the forward direction while absorbing impact energy during a secondary collision is the same as in a conventional steering column apparatus.

In the steering column apparatus of this example, the spacer 37 is placed inside the held bracket section 30 and supports the held bracket 30 in the up, down, left and right directions, so it is possible to substantially ensure the strength and rigidity of the held bracket section 30. In other words, even when the held bracket section 30 having a thin thickness is firmly held by the pair of holding plate sections 14a, due to the existence of the spacer 37, it become difficult for the held bracket section 30 to deform. Therefore, through operation of the adjustment handle 24, cam apparatus 25 and rod 15 in order to maintain the steering wheel 1 (see FIG. 18) in the adjusted position, the held bracket section 30 is prevented from deforming excessively in a direction that would reduce the width dimension even when the held bracket section 30 is firmly held between the holding plate sections 14a. As a result, it is possible to sufficiently increase the contact pressure between the left and right outside surfaces of the held bracket section 30 and the left and right inside surfaces of the holding plate sections 14a, and it becomes possible to sufficiently maintain the support strength for supporting the outer column 20a by the holding bracket 13a and the force for maintaining the adjusted up-down position of the steering wheel 1.

On the other hand, the rear end section of the inner column 19a is fitted inside the front end section of the outer column 20a on which the held bracket section 30 is provided. In order to maintain the adjusted forward-backward position of the steering wheel 1, it is necessary to reduce the width dimension of the held bracket section 30 in order to reduce the inner diameter of the front end section of the outer column 20a. There are gaps between both the left and right end sections of the front retaining plate section 43 and rear retaining plate section 44, which are provided on both the front and rear end sections of the spacer 37, and the downward hanging plate sections 39, so it is possible to elastically reduce the space between the downward hanging plate sections 39 to a certain extent. Therefore, it is possible to reduce the width dimension of the held bracket section 30, and to reduce the inner diameter of the front end section of the outer column 20a by the necessary amount, and thus it is possible to sufficiently increase the contact pressure between the inner circumferential surface of the front end of the outer column 20a and the outer circumferential surface of the rear end section of the inner column 19a. As a result, it is possible to sufficiently ensure the strength of the fitting of the outer column 20a with respect to the inner column 19a, and the support strength for maintaining the adjusted position in the forward-backward direction of the steering wheel 1.

It is difficult for the held bracket section 30 to deform even when an impact load is applied to the held bracket section 30 due to a secondary collision that follows a collision accident. Therefore, the behavior of the outer column 20 can be easily stabilized even while an impact load is applied, which is useful from the aspect of protecting the driver. Particularly, the upper edges of the long hole sections 34 in the forward-backward direction and the bottom surface of the base plate section 38 are located on the same plane, and the top end section of the outer circumferential surface of the rod 15 comes in contact with the top edge of the long hole sections 40 in the forward-backward direction and the bottom surface of the base plate section 38 along the entire width of the spacer 37. Therefore, even during a secondary collision, large loads are not locally applied to the portions where there is contact with the outer circumferential surface of the rod 15, and it is difficult for the spacer 37 and the held bracket section 30 that houses the spacer 37 to deform.

Furthermore, in this example, there is no contact between the inner peripheral edges of the through holes 33 that are formed in the metal held bracket section 30 and the outer circumferential surface of the metal rod 15, which is made of a hard metal such as tool steel. The outer circumferential surface of this rod 15 comes in contact with the inner peripheral edges of the long holes 40 that are formed in the synthetic resin spacer 37. As a result, it is possible to prevent the occurrence of vibrations and abnormal noise that are unpleasant for the driver and passengers even when adjusting the forward-backward position of the steering wheel 1.

Second Example

Figure 11:
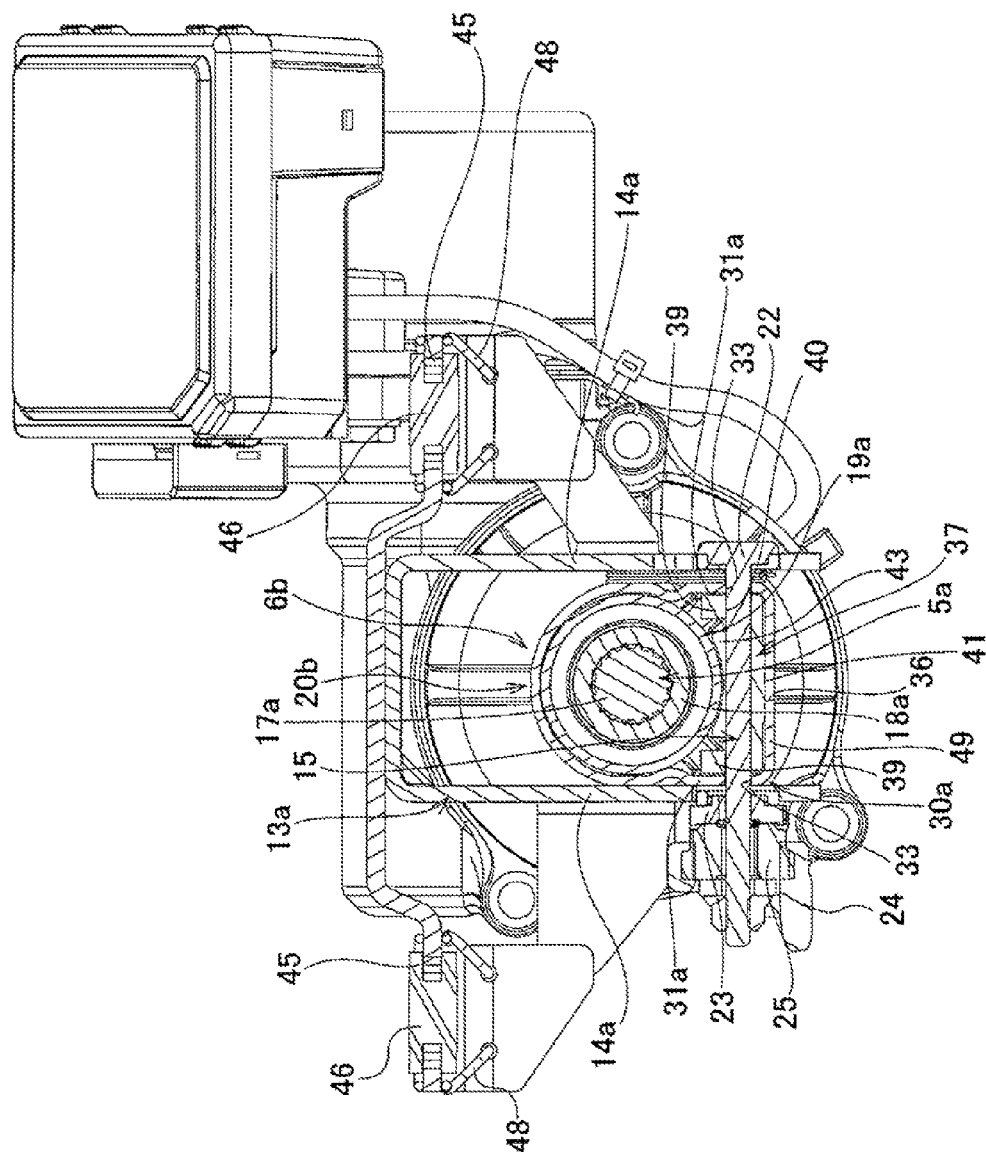
FIG. 11 is a drawing similar to FIG. 5, and illustrates a second example of an embodiment of the present invention.
Figure 12:
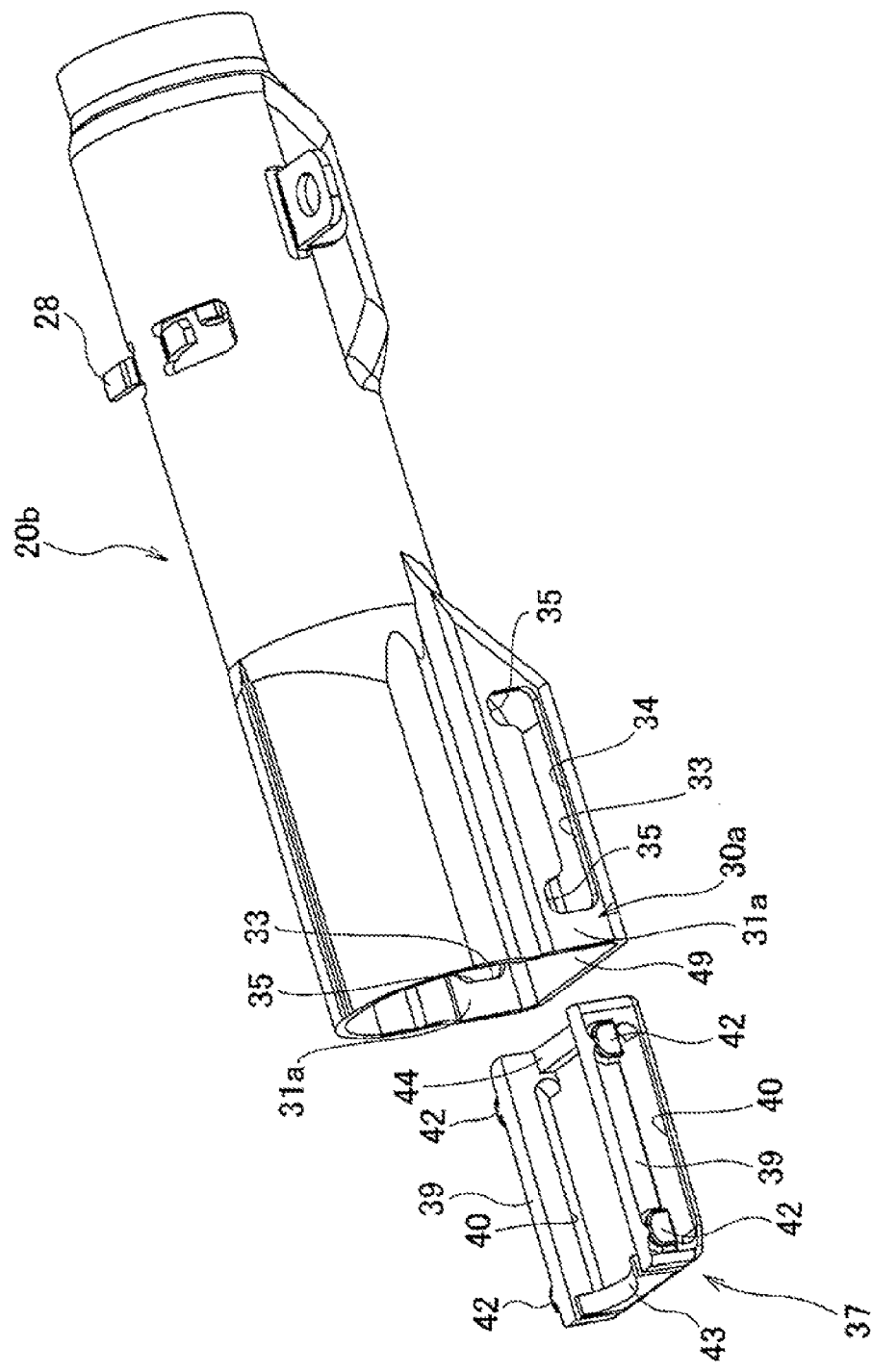
FIG. 12 is a drawing similar to FIG. 6, and illustrates the outer column and spacer of the second example in the state before combining these members.
Figure 13:
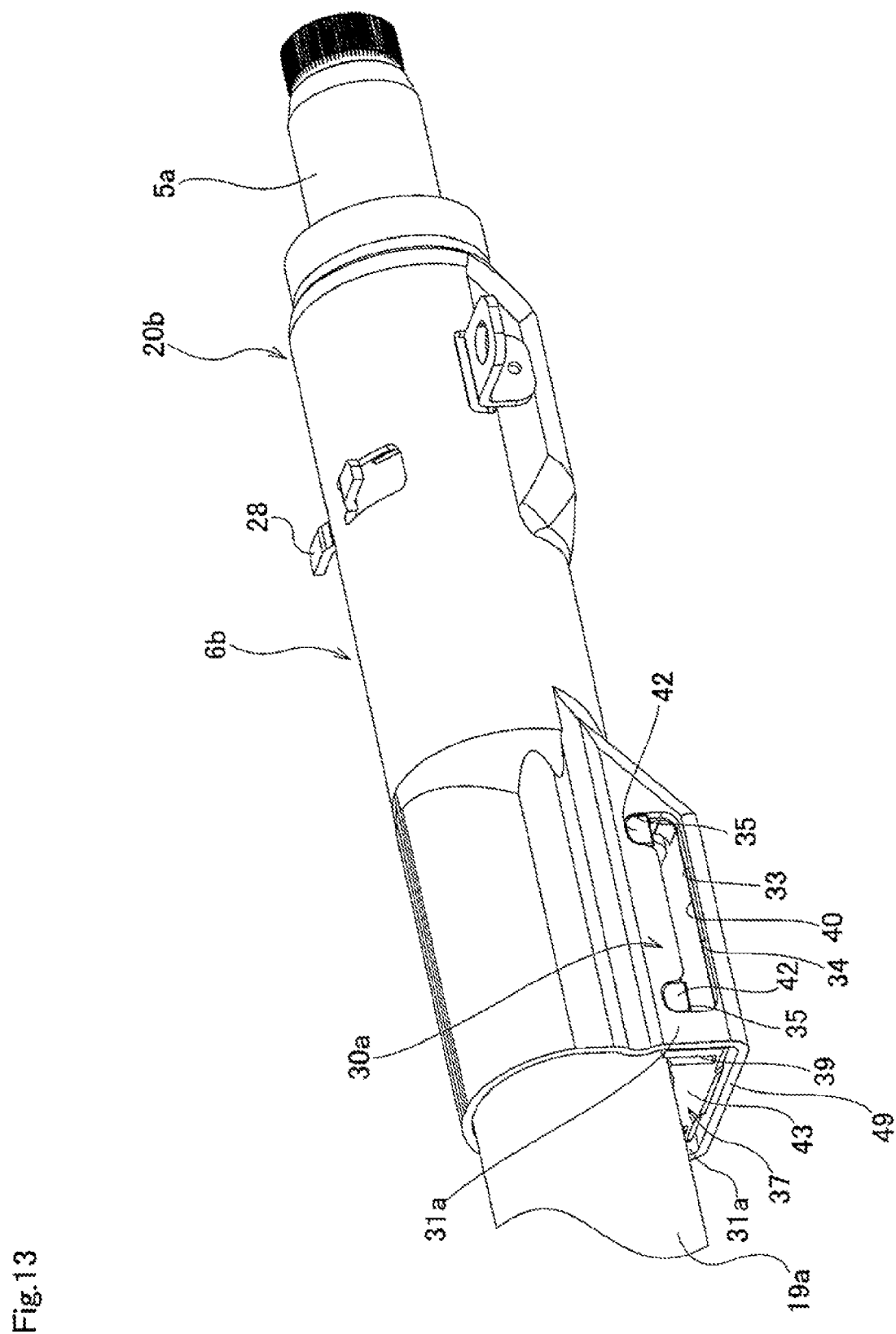
FIG. 13 is a drawing similar to FIG. 7, and illustrates the outer column, spacer and inner column of the second example in the state after combining these members.

FIG. 11 to FIG. 13 illustrate a second example of an embodiment of the present invention. In this example, opposite from the case of the first example of the embodiment, the held bracket section 30a that is formed on the front end section of the outer column 20b swells downward from the outer column 20b. In other words, the held bracket section 30a is constructed such that the bottom end sections of the pair of left and right held plate sections 31a are continuous from a bottom plate section 49. Through holes 33, which are each composed of a long hole section 34 in the forward-backward direction and notch sections 35, are provided in the held plate sections 31a such that the orientation in the up-down direction is opposite that in the first example of the embodiment. That is, the notch sections 35 protrude upward from both ends in the forward-backward direction of the long hole sections 34 in the forward-backward direction. A spacer 37 that is the same as that in the first example of the embodiment is assembled inside the held bracket section 30a such that the orientation in the up-down direction is opposite. A convex section 41 (see FIG. 6 and FIG. 9) comes in contact with the top surface of the bottom plate section 49. Except that the up-down direction of the location where the held bracket section 30a is formed on the outer column 20b is opposite, the other construction and functions are the same as in the first example of the embodiment.

Third Example

Figure 14:
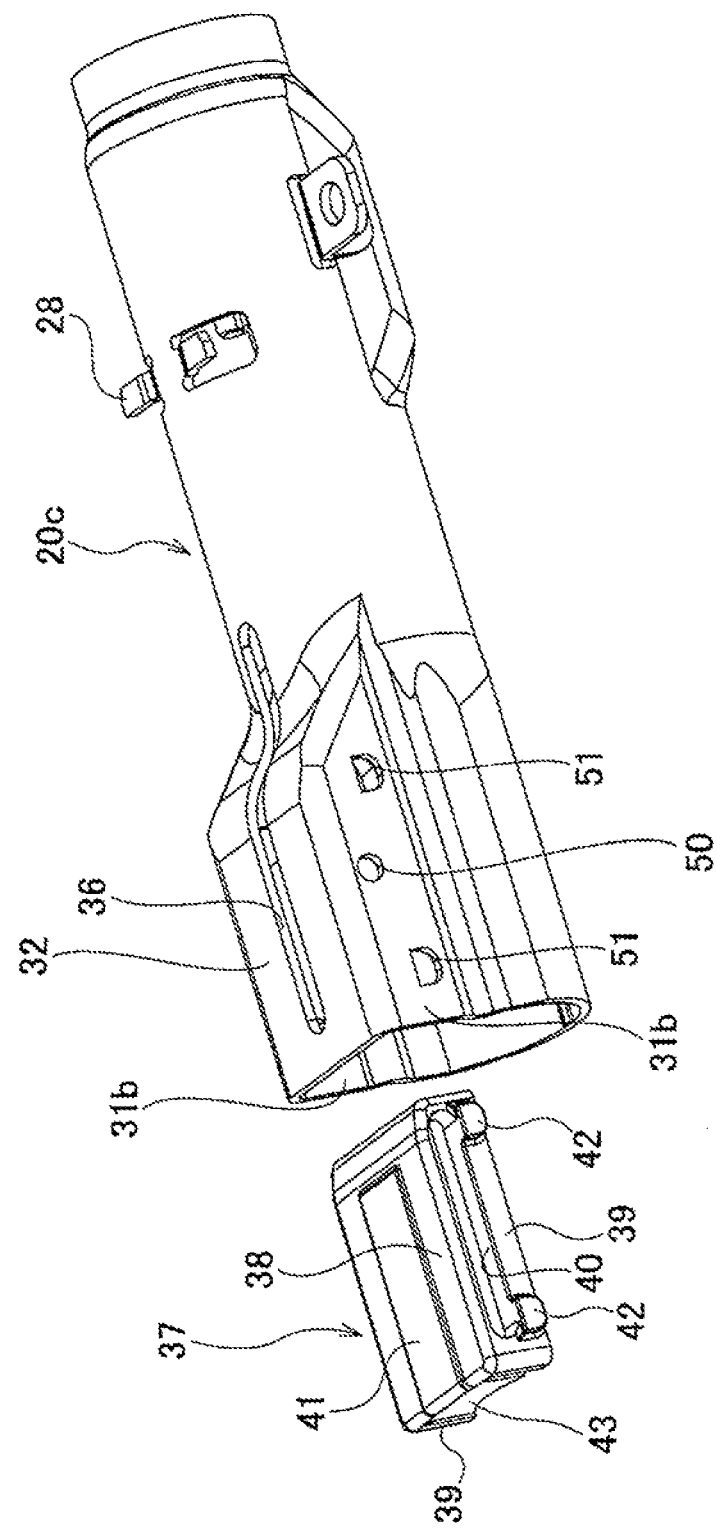
FIG. 14 is a drawing similar to FIG. 6, and illustrates a third example of an embodiment of the present invention.
Figure 15:
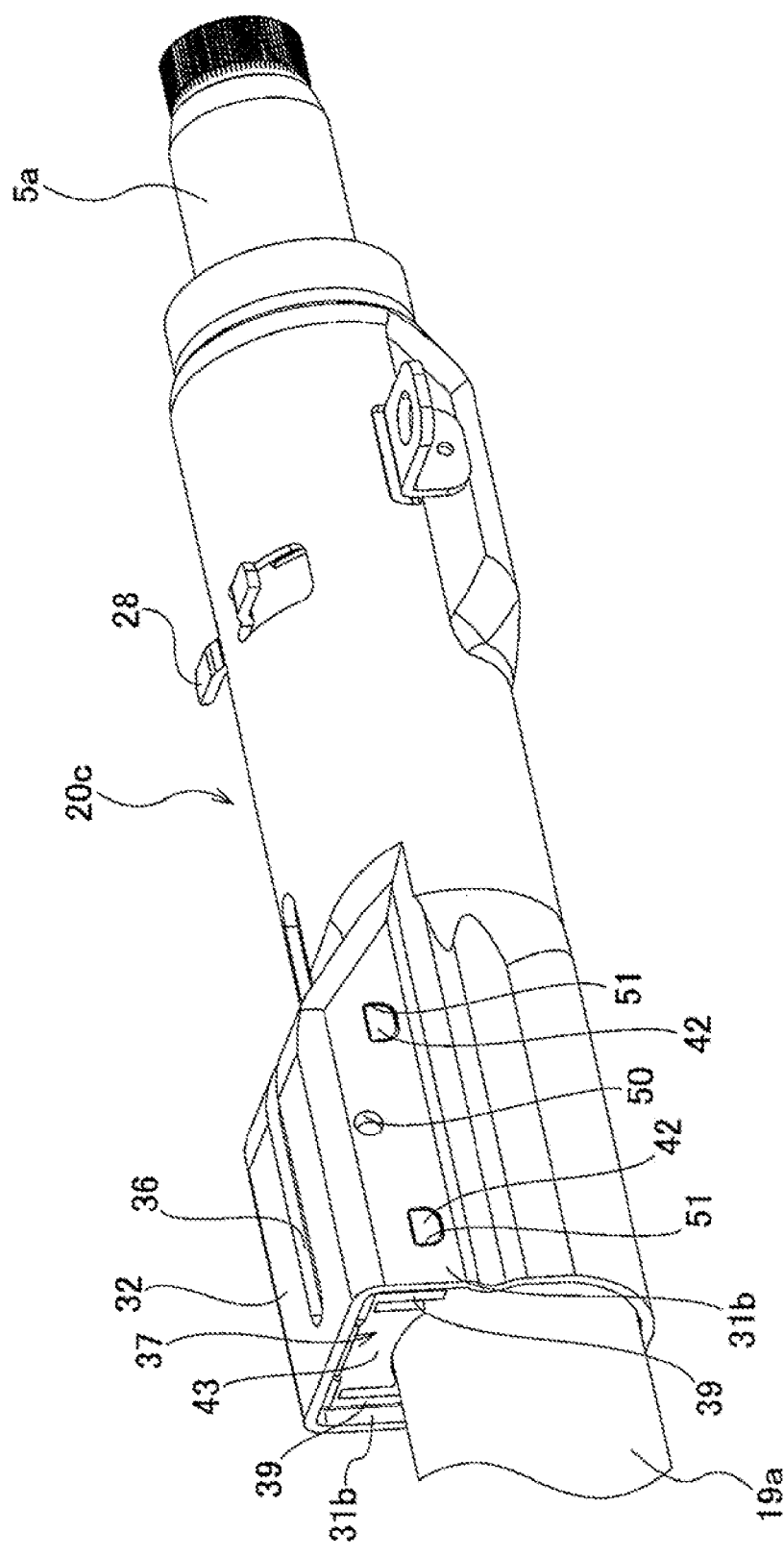
FIG. 15 is a drawing similar to FIG. 7, and illustrates the outer column, spacer and inner column in the third example in the state after combining these members.

FIG. 14 and FIG. 15 illustrate a third example of an embodiment of the present invention. This example can be applied to the construction in which the telescopic mechanism for adjusting the forward-backward position of the steering wheel is omitted, and there is only a tilt mechanism. In other words, the end section of the outer column 20c fits with the end section of the inner column 19a such that relative displacement in the axial direction is not possible. As the telescopic mechanism is omitted, in this example, the through holes that are formed in the portions in the middle section in the forward-backward direction of the held plate sections 31b that are aligned with each other are composed of circular holes 50. Moreover, in the portions near both ends in the forward-backward direction of the held plate sections 31b and a little lower than the circular holes 50, locking holes 51 for locking the locking convex sections 42 of the spacer 37 are formed. The spacer 37 that is combined with this kind of outer column 20c can be the same as that used in the first and section examples of the embodiment, so by having common parts, it is possible to reduce costs. However, the insertion holes that are formed in the spacer could also be simple circular holes. In this example, the telescopic mechanism is omitted, so there is no large displacement of the rod 15 (see FIG. 2, FIG. 4, FIG. 5 and FIG. 11) with respect to the through holes (circular holes 50) even when adjusting the position of the steering wheel. Therefore, there is no need to take into consideration the prevention of rubbing between the outer circumferential surface of the rod 15 and the peripheral edges of the through holes (circular holes 50). Except for making the through holes simple circular holes 50 due to omitting the telescopic mechanism, the construction is the same as in the first example of the embodiment.

Fourth Example

Figure 16:
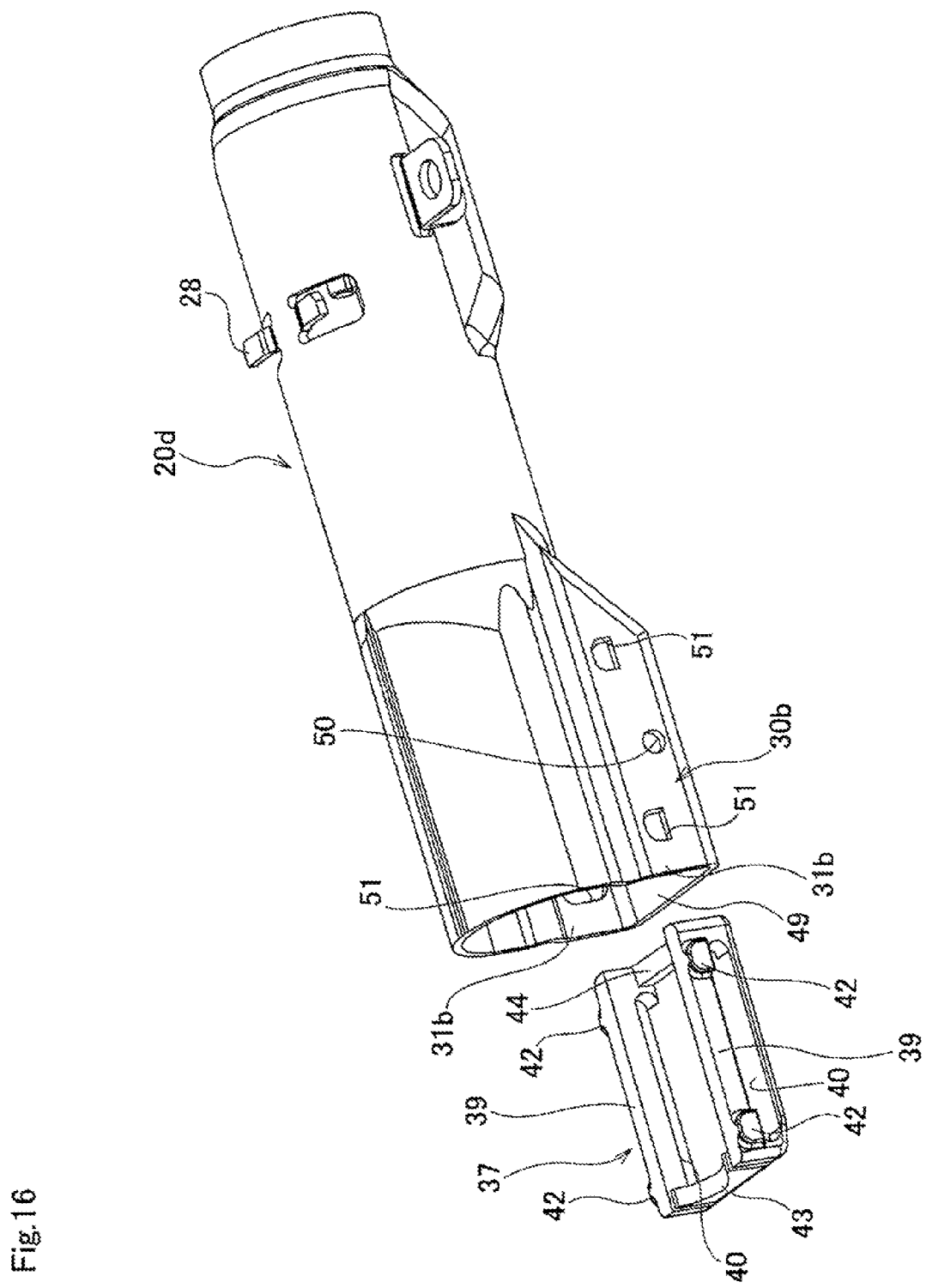
FIG. 16 is a drawing similar to FIG. 6, and illustrates a fourth example of an embodiment of the present invention.
Figure 17:
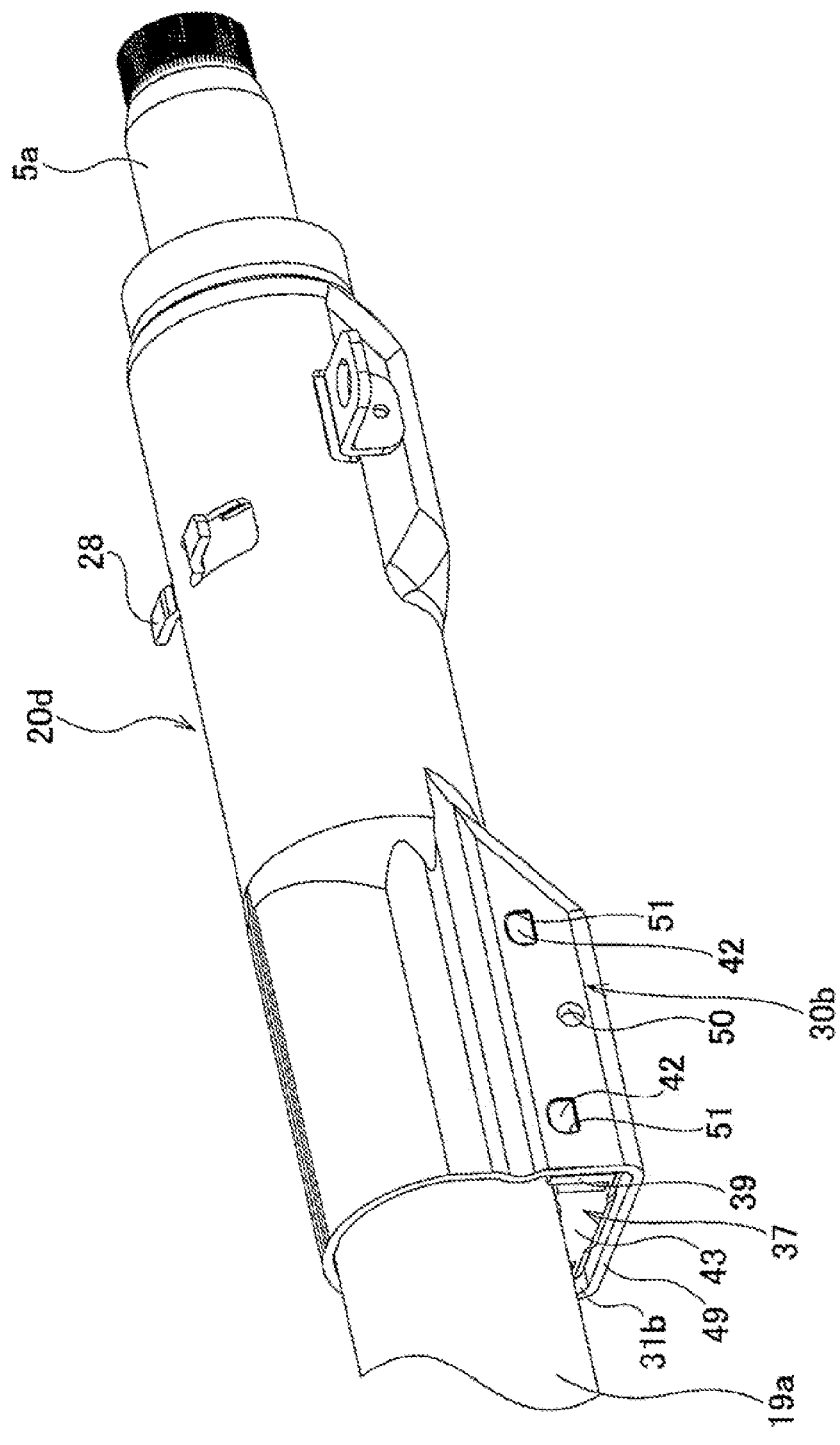
FIG. 17 is a drawing similar to FIG. 7, and illustrates the outer column, spacer and inner column in the fourth example in the state after combining these members.

FIG. 16 and FIG. 17 illustrate a fourth example of an embodiment of the present invention. In this example, the held bracket section 30b on the front end section of the outer column 20d is formed so as to protrude downward, opposite that in the third example of the embodiment. This is similar to the case of the construction of the second example with respect to the first example of the embodiment. Except that the up-down direction of the location where the held bracket section 30b is formed on the outer column 20d is opposite, the other construction and functions are the same as in the third example of the embodiment.

EXPLANATION OF REFERENCE NUMBERS

1 Steering wheel
2 Steering gear unit
3 Input shaft
4 Tie rod
5, 5a Steering shaft
6, 6a, 6b Steering column
7 Universal joint
8 Intermediate shaft
9 Universal joint
10, 10a Horizontal shaft
11, 11a Vehicle body
12 Held bracket
13, 13a Holding bracket
14, 14a Holding plate section
15 Rod
16 Long hole in the up-down direction
17, 17a Inner shaft
18, 18a Outer shaft
19, 19a Inner column
20, 20a, 20b, 20c, 20d Outer column
21 Long hole in the forward-backward direction
22 Head section
23 Pressure piece
24 Adjustment handle
25 Cam apparatus
26 Pivot support bracket section
27 Bearing
28 Locking section
29 Key-lock collar
30, 30a, 30b Held bracket section
31, 31a, 31b Held plate section
32 Top plate section
33 Through hole
34 Long hole section in the forward-backward direction
35 Notch section
36 Slit
37 Spacer
38 Base plate section
39 Downward hanging plate section 40 Long hole
41 Convex section
42 Locking convex section
43 Front restraining plate
44 Rear restraining plate
45 Installation plate section
46 Locking capsule
47 Bolt or stud
48 Energy absorbing member
49 Bottom plate section
50 Circular hole
51 Locking hole

What is claimed is:

1. A steering column apparatus comprising:
a cylindrical inner column;
a cylindrical outer column having an end section that fits with an end section of the inner column;
a held bracket section that is integrally formed with the outer column in the end section of the outer column that fits with the end section of the inner column by causing a metal plate of the outer column to swell outward in a radial direction of the outer column;
the held bracket section comprising a pair of left and right held plate sections that are parallel with each other, and having a pair of through holes that are formed in portions of the held plate sections that are aligned with each other through which a rod for expanding or contracting a space between the held plate sections is located; and
a spacer formed of a material that is softer than the metal plate of the outer column, the spacer having insertion holes for inserting the rod in portions that are aligned with the through holes, the spacer being located on the inside of the held bracket section and between the held plate sections;
wherein the held bracket section has locking holes provided in portions thereof near front ends and rear ends of the held plate sections;
the insertion holes have a width dimension in an up-down direction of the insertion holes that is less than a width dimension in an up-down direction of the through holes;
locking convex sections that fit with the locking holes are provided in portions of left and right outside surfaces of the spacer; and
with the locking convex sections engaged with the locking holes, top edges and bottom edges of each of the insertion holes are located further on the inside than top edges and bottom edges of the through holes, so that an outer circumferential surface of the rod that is inserted through the insertion holes and the through holes does not come in contact with inner peripheral edges of the through holes.

2. The steering column apparatus according to claim 1, wherein
the held bracket section is provided so as to protrude upward from the end section of the outer column;
the through holes are composed of circular holes that are formed in portions in the middle sections in the forward-backward direction of the held plate sections that are aligned with each other;
the insertion holes are provided in portions at least parts of which are aligned with the through holes;
locking convex sections are provided in portions of the left and right outside surfaces of the spacer that are aligned with the locking holes; and
the top surface of the spacer comes in contact with the inside surface of the held bracket section, and the locking convex sections engage with the locking holes.

3. The steering column apparatus according to claim 1, wherein
the held bracket section is provided so as to protrude downward from the end section of the outer column;
the through holes are composed of circular holes that are formed in portions in the middle sections in the forward-backward direction of the held plate sections that are aligned with each other;
the insertion holes are provided in portions at least part of which are aligned with the through holes;
locking convex sections are provided in portions of the left and right outside surfaces of the spacer that are aligned with the locking holes; and
the bottom surface of the spacer comes in contact with the inside surface of the held bracket section, and the locking convex sections engage with the locking holes.

4. A steering column apparatus comprising:
a cylindrical inner column;
a cylindrical outer column having an end section that fits with an end section of the inner column, wherein the end section of the outer column is fitted with the end section of the inner column such that relative displacement in an axial direction of the outer column is possible;
a held bracket section that is integrally formed with the outer column in the end section of the outer column that fits with the end section of the inner column by causing a metal plate of the outer column to swell outward in a radial direction of the outer column,
the held bracket section comprising a pair of left and right held plate sections that are parallel with each other, and having a pair of through holes that are formed in portions of the held plate sections that are aligned with each other through which a rod for expanding or contracting a space between the held plate sections is located, each of the through holes is composed of a long hole section in a forward-backward direction that extends in the axial direction of the outer column, and a pair of notch sections that protrude upward from both end sections in the forward-backward direction of the long hole section;
a spacer formed of a material that is softer than the metal plate of the outer column, the spacer having insertion holes for inserting the rod in portions that are aligned with the through holes, the spacer being located on the inside of the held bracket section and between the held plate sections, the insertion holes are composed of long holes that are provided in portions that are aligned with the long hole sections in a forward-backward direction of the through holes, and that extend in the forward-backward direction and have a width dimension in the up-down direction of the insertion holes that is less than the width dimension in the up-down direction of the long hole sections in the forward-backward direction; and
locking convex sections that fit with the notch sections and are provided on the top sides of both end sections in the forward-backward direction of the long holes;
with the bottom surface of the spacer coming in contact with an inside surface of the held bracket section, and with the locking convex sections engaged with the notch sections, the outer circumferential surface of the rod that is inserted through the insertion holes and the long hole sections in the forward-backward direction does not come in contact with inner peripheral edges of the long hole section in the forward-backward direction.

\* \* \* \* \*